United States Patent
Dams et al.

(10) Patent No.: US 10,294,609 B2
(45) Date of Patent: May 21, 2019

(54) FLUORINE-FREE FIBROUS TREATING COMPOSITIONS INCLUDING ISOCYANATE-DERIVED ETHYLENICALLY UNSATURATED MONOMER-CONTAINING OLIGOMERS, AND TREATING METHODS

(71) Applicant: 3M INNOVATIVE PROPERTIES COMPANY, St. Paul, MN (US)

(72) Inventors: Rudolf J. Dams, Antwerp (BE); Dirk M. Coppens, Beveren (BE); Chetan P. Jariwala, Woodbury, MN (US); Lin Chen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/548,196

(22) PCT Filed: Feb. 9, 2016

(86) PCT No.: PCT/US2016/017076
§ 371 (c)(1),
(2) Date: Aug. 2, 2017

(87) PCT Pub. No.: WO2016/130503
PCT Pub. Date: Aug. 18, 2016

(65) Prior Publication Data
US 2018/0023245 A1    Jan. 25, 2018

Related U.S. Application Data

(60) Provisional application No. 62/116,025, filed on Feb. 13, 2015.

(51) Int. Cl.
| | |
|---|---|
| *D06M 15/564* | (2006.01) |
| *C08G 18/62* | (2006.01) |
| *C08G 18/72* | (2006.01) |
| *C08G 18/80* | (2006.01) |
| *C09D 133/00* | (2006.01) |
| *C08G 18/61* | (2006.01) |
| *C08G 18/67* | (2006.01) |
| *C08F 220/00* | (2006.01) |
| *C08G 18/71* | (2006.01) |
| *C08G 18/76* | (2006.01) |
| *C08G 18/78* | (2006.01) |
| *C08G 18/81* | (2006.01) |
| *C08G 18/28* | (2006.01) |
| *C09D 175/04* | (2006.01) |
| *C08G 18/77* | (2006.01) |

(52) U.S. Cl.
CPC ......... *D06M 15/564* (2013.01); *C08F 220/00* (2013.01); *C08G 18/288* (2013.01); *C08G 18/2825* (2013.01); *C08G 18/61* (2013.01); *C08G 18/672* (2013.01); *C08G 18/71* (2013.01); *C08G 18/7621* (2013.01); *C08G 18/7664* (2013.01); *C08G 18/7671* (2013.01); *C08G 18/775* (2013.01); *C08G 18/7831* (2013.01); *C08G 18/8077* (2013.01); *C08G 18/8116* (2013.01); *C09D 133/00* (2013.01); *C09D 175/04* (2013.01); *D06M 2200/12* (2013.01)

(58) Field of Classification Search
CPC ............ C08G 18/6225; C08G 18/6245; C08G 18/72; C08G 18/80; C08F 2220/343; D06M 15/564
See application file for complete search history.

(56) References Cited

U.S. PATENT DOCUMENTS

| | | |
|---|---|---|
| 2,941,988 A | 6/1960 | Wolf |
| 3,862,989 A | 1/1975 | Hansen |
| 3,896,251 A | 7/1975 | Landucci |
| 4,495,243 A | 1/1985 | Kishi |
| 4,692,503 A | 9/1987 | Das |
| 5,047,065 A | 9/1991 | Vogel |
| 5,061,756 A | 10/1991 | Hassel |

(Continued)

FOREIGN PATENT DOCUMENTS

| | | |
|---|---|---|
| CN | 103628324 | 3/2014 |
| EP | 0448399 | 9/1991 |

(Continued)

OTHER PUBLICATIONS

AATCC Test Method 22/1996, Technical Manual of the American Associate of Textile Chemists and Colorists (AATCC), 2001, pp. 63-65.

(Continued)

*Primary Examiner* — Vu A Nguyen

(57) ABSTRACT

A fluorine-free composition includes one or more compounds derived from a reaction mixture that includes: (i) at least one isocyanate-reactive (i.e., functionalized) oligomer comprising 2 to 20 repeating units; (ii) at least one polyisocyanate; (iii) optionally at least one additional isocyanate-reactive compound; and (iv) optionally at least one isocyanate blocking agent; wherein the isocyanate-reactive oligomer is made by the radical-initiated reaction of a reaction mixture comprising at least one mercaptan and Sat least one (meth)acrylate monomer, wherein the at least one (meth)acrylate monomer comprises at least one isocyanate-derived group (e.g., a urethane group or a urea group) and at least one hydrocarbon group having at least 16 carbon atoms (and in some embodiments, up to 60 carbon atoms). Such compositions are useful for treating fibrous substrates to enhance their water-repellency.

16 Claims, No Drawings

(56) References Cited

U.S. PATENT DOCUMENTS

| | | | |
|---|---|---|---|
| 5,225,480 A | 7/1993 | Tseng | |
| 5,276,175 A | 1/1994 | Dams | |
| 5,350,631 A | 9/1994 | Tseng | |
| 5,604,268 A | 2/1997 | Randen | |
| 5,817,249 A | 10/1998 | Audenaert | |
| 5,856,611 A | 1/1999 | Schlaefer | |
| 7,354,458 B2 | 4/2008 | Sandner | |
| 7,559,639 B2 | 7/2009 | Belelie | |
| 7,750,093 B2 | 7/2010 | Elsbernd | |
| 7,934,823 B2 | 5/2011 | Belelie | |
| 7,950,948 B2 | 5/2011 | Amidon | |
| 8,236,870 B2 | 8/2012 | Breton | |
| 8,440,779 B2 * | 5/2013 | Audenaert | C07C 267/00 528/48 |
| 8,690,305 B2 | 4/2014 | Breton | |
| 8,703,894 B2 | 4/2014 | Duschek | |
| 8,742,022 B2 | 6/2014 | Pokorny | |
| 8,853,293 B2 | 10/2014 | Breton | |
| 2006/0094851 A1 | 5/2006 | Audenaert | |
| 2010/0173085 A1 | 7/2010 | Jariwala | |
| 2014/0202647 A1 | 7/2014 | Hagiopol | |

FOREIGN PATENT DOCUMENTS

| | | |
|---|---|---|
| EP | 0919576 | 6/1999 |
| EP | 0987362 | 3/2000 |
| JP | H04-272917 | 9/1992 |
| JP | 2000-136351 | 5/2000 |
| JP | 2010-132844 | 6/2010 |
| WO | WO 1992-017635 | 10/1992 |
| WO | WO 2002-038850 | 5/2002 |
| WO | WO 2007-027420 | 3/2007 |
| WO | WO 2010-115496 | 10/2010 |
| WO | WO 2012-082516 | 6/2012 |
| WO | WO 2013-162704 | 10/2013 |
| WO | WO 2013-162705 | 10/2013 |
| WO | WO 2016-130352 | 8/2016 |
| WO | WO 2016-130415 | 8/2016 |

OTHER PUBLICATIONS

Kissa, Fluorinated Surfactants and Repellents, 516-551 (2001).
Noll, Chemistry and Technology of Silicones, 585-595 (2012).
Organic Coatings and Applied Polymer Science Proceedings, vol. 48, Division of Organic Coatings and Plastics Chemistry at the American Chemical Society, 185th National Meeting, Seattle, Washington, Mar. 1983, pp. 998-1002.
Radhakrishnan, "Synthesis and Characterization of New Urethane-Acrylic Polymers," *Angewandte Makromoleculare Chemie*, vol. 187, 1991, pp. 1-10.
International Search Report for PCT International Application No. PCT/US2016/016713, dated May 31, 2016, 4 pages.
International Search Report for PCT International Application No. PCT/US2016/017076, dated Apr. 18, 2016, 5 pages.
International Search Report for PCT International Application No. PCT/US2016/015945, dated May 2, 2016, 4 pages.

* cited by examiner

FLUORINE-FREE FIBROUS TREATING COMPOSITIONS INCLUDING ISOCYANATE-DERIVED ETHYLENICALLY UNSATURATED MONOMER-CONTAINING OLIGOMERS, AND TREATING METHODS

BACKGROUND

Compositions for treating fibrous substrates to enhance the water-repellency of the substrates are known and described in the literature, for example, in "Fluorinated Surfactants and Repellents," E. Kissa, Surfactant Science Series, vol. 97, Marcel Dekker, New York, Chapter 12, p. 516-551, or in "Chemistry and Technology of Silicones," by W. Noll, Academic Press, New York, Chapter 10, p. 585-595; however, there is a continual need for compositions that provide high water repellency, in particular high initial water repellency, and in certain situations, high water-repellent durability, especially compositions that are fluorine-free.

SUMMARY OF THE DISCLOSURE

The present disclosure provides fluorine-free fibrous treating compositions, compounds, and methods of use.

In one embodiment, the present disclosure provides a fluorine-free treating composition, and a method of treating a fibrous substrate, wherein the method includes applying a fluorine-free treating composition in an amount sufficient to make the fibrous substrate water repellent (and in certain embodiments, durably water repellent).

In such compositions and methods, the treating composition includes one or more compounds derived from a reaction mixture that includes:

(i) at least one isocyanate-reactive (i.e., functionalized) oligomer comprising 2 to 20 repeating units;
(ii) at least one polyisocyanate;
(iii) optionally at least one additional isocyanate-reactive compound; and
(iv) optionally at least one isocyanate blocking agent;

wherein the isocyanate-reactive oligomer is made by the radical-initiated reaction of a reaction mixture comprising at least one mercaptan and at least one (meth)acrylate monomer, wherein the at least one (meth)acrylate monomer comprises at least one (typically, one) isocyanate-derived group (e.g., a urethane group or a urea group) and at least one (typically, one) hydrocarbon group having at least 16 carbon atoms (and in some embodiments, up to 60 carbon atoms).

The present disclosure also provides a fibrous substrate treated with such composition. In certain embodiments, the fibrous substrate is selected from the group of textile, leather, carpet, paper, and nonwoven fabrics.

In certain embodiments, the present disclosure provides a fluorine-free compound prepared by reacting components that include:

(i) at least one functionalized oligomer;
(ii) at least one aromatic polyisocyanate; and
(iv) at least one oxime isocyanate blocking agent;

wherein the functionalized oligomer comprises at least one of the following formulas:

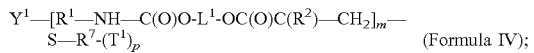

$Y^1$—[$R^1$—NH—C(O)O-$L^1$-OC(O)C($R^2$)—$CH_2$]$_m$—S—$R^7$-($T^1$)$_p$  (Formula IV);

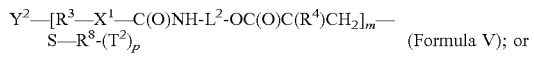

$Y^2$—[$R^3$—$X^1$—C(O)NH-$L^2$-OC(O)C($R^4$)$CH_2$]$_m$—S—$R^8$-($T^2$)$_p$  (Formula V); or

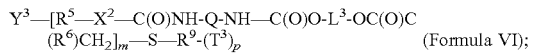

$Y^3$—[$R^5$—$X^2$—C(O)NH-Q-NH—C(O)O-$L^3$-OC(O)C($R^6$)$CH_2$]$_m$—S—$R^9$-($T^3$)$_p$  (Formula VI);

wherein:
$Y^1$, $Y^2$, and $Y^3$ are independently H or an initiator residue;
$R^1$, $R^3$, and $R^5$ are independently a hydrocarbon group having at least 16 carbon atoms;
$R^2$, $R^4$, and $R^6$ are independently H or $CH_3$;
$L^1$, $L^2$, and $L^3$ are independently a branched or straight chain alkylene group having 2 to 10 carbon atoms, an arylene group, or a combination thereof;
$X^1$ and $X^2$ are independently O, S, —NH, or —N($R^{10}$), wherein $R^{10}$ is a hydrocarbon group of 1 to 20 carbon atoms;
Q is a divalent isocyanate residue;
each m is independently an integer of 2 to 20;
$R^7$, $R^8$, and $R^9$ are independently a divalent or trivalent linking group having 1 to 10 carbon atoms;
$T^1$, $T^2$, and $T^3$ are is independently —OH, —$NH_2$, or —NH($R^{11}$), wherein $R^{11}$ is H or a hydrocarbon group (in certain embodiments, an alkyl group) having 1 to 10 carbon atoms;
each p is independently 1 or 2; and
S is sulfur.

Herein, a "fluorine-free" treating composition means that a treating composition includes less than 1 weight percent (1 wt-%) fluorine in a treating composition based on solids, whether in a concentrate or ready-to-use treating composition. In certain embodiments, a "fluorine-free" treating composition means that a treating composition includes less than 0.5 wt %, or less than 0.1 wt %, or less than 0.01 wt-%. The fluorine may be in the form of organic or inorganic fluorine-containing compounds.

The term "oligomer" includes compounds with at least 2 repeating units and up to 20 repeating units. According to a particular embodiment, the oligomer has 3 to 15 repeating units. According to another embodiment, the oligomer has 4 to 15 repeating units.

The term "residue" means that part of the original organic molecule remaining after reaction.

The term "hydrocarbon" refers to any substantially fluorine-free organic group that contains hydrogen and carbon. Such hydrocarbon groups may be cyclic (including aromatic), linear, or branched. Suitable hydrocarbon groups include alkyl groups, alkylene groups, arylene groups, and the like. Unless otherwise indicated, hydrocarbon groups typically contain from 1 to 60 carbon atoms. In some embodiments, hydrocarbon groups contain 1 to 30 carbon atoms, 1 to 20 carbon atoms, 1 to 10 carbon atoms, 1 to 6 carbon atoms, 1 to 4 carbon atoms, or 1 to 3 carbon atoms.

The term "alkyl" refers to a monovalent group that is a residue of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 60 carbon atoms. In some embodiments, the alkyl groups contain 1 to 30 carbon atoms, 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, octadecyl, behenyl, adamantyl, norbornyl, and the like.

The term "alkylene" refers to a divalent group that is a residue of an alkane and includes groups that are linear, branched, cyclic, bicyclic, or a combination thereof. Unless otherwise indicated, the alkylene group typically has 1 to 60 carbon atoms. In some embodiments, the alkylene group has 1 to 30 carbon atoms, 1 to 20 carbon atoms, 1 to 10 carbon atoms, 2 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, 1,6 hexamethylene, and 1,10 decamethylene.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 5 to 20 carbon atoms, 5 to 18 carbon atoms, 5 to 16 carbon atoms, 5 to 12 carbon atoms, 6 to 12 carbon atoms, or 6 to 10 carbon atoms.

The term (meth)acrylate refers to acrylates and methacrylates.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The term "room temperature" refers to a temperature of 20° C. to 25° C. or 22° C. to 25° C.

Herein, when a group is present more than once in a formula described herein, each group is "independently" selected, whether specifically stated or not. For example, when more than one Q group is present in a formula, each Q group is independently selected. Furthermore, subgroups contained within these groups are also independently selected.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides fluorine-free treating compositions for fibrous substrates, compounds, and methods of use.

Treating compositions of the present disclosure are useful for treating a fibrous substrate to enhance the substrate's water repellency. As used herein, a substrate is water repellent if it demonstrates a minimum initial spray rating of at least 80, as determined by the Spray Rating Test described in the Examples Section. In certain embodiments, the initial spray rating is at least 90, or at least 100, as determined by the Spray Rating Test described in the Examples Section.

In certain embodiments, the fibrous substrates are treated such that they become durably water repellent. As used herein, a substrate is durably water repellent if it demonstrates a spray rating of at least 50 after 10 launderings, as determined by the Spray Rating Test with launderings (and optional launderings), described in the Examples Section. In certain embodiments, the spray rating is at least 80 after 10 launderings, or at least 80 after 20 launderings, as determined by the Spray Rating Test with launderings (and optional drying), described in the Examples Section.

Typically, an amount of treating composition is used to obtain a desired initial spray rating level and/or a desired spray rating level after laundering multiple times. In certain embodiments, the amount of treating composition is at least 0.1 weight percent (wt-%), or at least 0.2 wt-%, or at least 0.3 wt-% SOF (solids on fabric). In certain embodiments, the amount of treating composition is up to 2 wt-%, or up to 1.5 wt-%, or up to 1 wt-% SOF (solids on fabric).

Exemplary fibrous substrates include textile, leather, carpet, paper, and nonwoven fabrics.

Treating compositions of the present disclosure may be in the form of a concentrate, which may include up to 80 weight percent (wt-%) water, based on the total weight of the concentrated treating composition. Alternatively, treating compositions of the present disclosure may be in the form of a ready-to-use formulation, which may include more than 80 wt-% water, or at least 85 wt-% water, or at least 90 wt-% water, or at least 95 wt-% water, based on the total weight of the ready-to-use treating composition. In certain embodiments, a ready-to-use treating composition of the present disclosure include 98-99 wt-% water, based on the total weight of the ready-to-use treating composition.

Treating compositions of the present disclosure include one or more compounds derived from a reaction mixture including:

(i) at least one isocyanate-reactive oligomer comprising 2 to 20 repeating units; (ii) at least one polyisocyanate;

(iii) optionally at least one additional isocyanate-reactive compound; and (iv) optionally at least one isocyanate blocking agent.

In certain embodiments, treating compositions of the present disclosure include one or more compounds derived from a reaction mixture including:

(i) at least one isocyanate-reactive oligomer comprising 2 to 20 repeating units (i.e., a functionalized oligomer);

(ii) at least one aromatic polyisocyanate; and (iv) at least one isocyanate blocking agent.

Typically, compounds of the present disclosure, or mixtures thereof, used in treating compositions of the present disclosure may be prepared in a two-step reaction, or optionally three-step reaction, although it will generally not be required to separate reaction products after the individual steps. That is, the reaction may be carried out in three steps in a single reactor. In a first step, a functionalized oligomer having at least two repeating units is prepared. In a second step, this functionalized oligomer is reacted with an isocyanate to form an isocyanate-containing oligomer (i.e., an oligomer having at least one isocyanate end group). Thus, the term "functionalized oligomer" means an oligomer that contains a functional group capable of reacting with an isocyanate. In an optional third step, the isocyanate-containing oligomer (i.e., oligomer with isocyanate end groups) is further reacted in a blocking reaction to form a blocked (e.g., blocked urethane) oligomer. Thus, the reaction product of the second step, i.e., the oligomer that includes at least one isocyanate group (e.g., an isocyanate end group), may be formed in the reaction mixture without being isolated (i.e., it is formed in situ).

(Meth)acrylate Monomers and Oligomerization Thereof

In a first step, (meth)acrylate monomers are used to make isocyanate-reactive (i.e., functionalized) oligomers that includes 2 to 20 repeating units. The term "functionalized oligomer" means an oligomer that contains a functional group capable of reacting with an isocyanate. Such isocyanate-reactive or functionalized oligomers are made by the radical-initiated reaction of a reaction mixture that includes at least one mercaptan and at least one (meth)acrylate monomer. The (meth)acrylate monomer includes at least one isocyanate-derived group (e.g., a urethane group or a urea group) and at least one hydrocarbon group having at least 16 carbon atoms (and in some embodiments, up to 60 carbon atoms).

Suitable (meth)acrylate monomers typically have a formula R—W—OC(O)C(R')=CH$_2$, wherein R is a hydrocarbon group having at least 16 carbon atoms (in certain embodiments, up to 60 carbon atoms, or up to 30 carbon atoms); R' is H or CH$_3$; and W is a linking group containing up to 30 carbon atoms, optionally interrupted by O, N or S atoms and containing at least one isocyanate-derived group, such as a urethane or urea group.

In certain embodiments, the (meth)acrylate monomer that includes at least one isocyanate-derived group and at least one hydrocarbon group having at least 16 carbon atoms has at least one of the following formulas:

R$^1$—NH—C(O)O-L$^1$-OC(O)C(R$^2$)=CH$_2$  (Formula I);

R$^3$—X$^1$—C(O)NH-L$^2$-OC(O)C(R$^4$)=CH$_2$  (Formula II); or

R$^5$—X$^2$—C(O)NH-Q-NH—C(O)O-L$^3$-OC(O)C(R$^6$)=CH$_2$  (Formula III).

In Formulas I, II, and III, R$^1$, R$^3$, and R$^5$ are independently a hydrocarbon group having at least 16 carbon atoms (in certain embodiments, up to 60 carbon atoms or up to 30 carbon atoms). Examples of such hydrocarbon groups include a hexadecyl (C16) group, octadecyl (C18) group, an arachidyl (C20) group, a behenyl (C22) group, a lignoceryl (C24) group, a ceryl (C26) group, a montanyl (C28) group, a myricyl (C30) group, a 2-dodecylhexadecyl (C28 branched) group, a 2-tetradecyloctadecyl (C32 branched) group, and long chain linear alkyl groups of 30 to 60 carbon atoms (available under the UNILIN brand). In certain embodiments, R$^3$ and R$^5$ may be branched.

In Formulas I, II, and III, R$^2$, R$^4$, and R$^6$ are independently H or CH$_3$.

In Formulas I, II, and III, L$^1$, L$^2$, and L$^3$ are independently a branched or straight chain alkylene group having 2 to 10 carbon atoms, an arylene group (in certain embodiments, an arylene group having 5 to 12 carbon atoms), or a combination thereof. Examples of such alkylene groups include —CH$_2$CH$_2$—, —CH$_2$CH$_2$CH$_2$—, —CH$_2$CH$_2$CH$_2$CH$_2$—, and the like. Examples of such arylene groups include phenyl, naphthyl, and the like. Examples of combinations of alkylene and arylene groups include benzyl, ethylphenyl, and the like. In certain embodiments, L$^1$, L$^2$, and L$^3$ are independently a branched or straight chain alkylene group having 2 to 10 carbon atoms.

In Formulas II and III, X$^1$ and X$^2$ are independently O, S, —NH, or —N(R$^{10}$) wherein R$^{10}$ is a hydrocarbon group (in certain embodiments, an alkyl group) having 1 to 20 carbon atoms. Examples of R$^{10}$ hydrocarbon groups include alkyl groups such as methyl, ethyl, decyl, octadecyl, and the like.

In Formula III, Q is a divalent isocyanate residue (e.g., an aromatic or aliphatic diisocyanate without the 2 isocyanate functional groups). Examples of divalent isocyanate residues include 2,4-toluenyl and 4,4'-methylenebis(phenyl).

Examples of suitable (meth)acrylate monomers of Formula I include the reaction product of stearylisocyanate with 2-hydroxyethyl(meth)acrylate (i.e., C$_{18}$H$_{37}$—NHC(O)O—CH$_2$CH$_2$—OC(O)C(R$^2$)=CH$_2$) wherein R$^2$ is H or CH$_3$), the reaction product of stearyl isocyanate with 3-hydroxypropyl(meth)acrylate, and the reaction product of stearylisocynate with 4-hydroxybutyl(meth)acrylate.

Examples of suitable (meth)acrylate monomers of Formula II include the reaction product of isocyanatoethyl(meth)acrylate with stearyl alcohol (i.e., C$_{18}$H$_{37}$—OC(O)NH—CH$_2$CH$_2$—OC(O)C(R$^4$)=CH$_2$) wherein R$^4$ is H or CH$_3$), the reaction product of isocyanatoethyl(meth)acrylate with behenyl alcohol, the reaction product of isocyanatoethyl(meth)acrylate with 2-tetradecyloctadecanol, and the reaction product of isocyanatoethyl(meth)acrylate with octadecylamine.

Examples of suitable (meth)acrylate monomers of Formula III include the reaction product of 2,4-toluene diisocyanate (TDI) with stearyl alcohol and 2-hydroxyethyl (meth)acrylate (i.e., C$_{18}$H$_{37}$—OC(O)NH—C$_7$H$_6$NHC(O)OCH$_2$CH$_2$—OC(O)CR$^6$=CH$_2$) wherein R$^6$ is H or CH$_3$), the reaction product of TDI with stearyl alcohol and 3-hydroxypropyl(meth)acrylate, the reaction product of TDI with stearyl alcohol and 4-hydroxybutyl(meth)acrylate, the reaction product of TDI with behenyl alcohol and 2-hydroxyethyl(meth)acrylate, and the like.

In certain embodiments, the (meth)acrylate monomer comprising at least one isocyanate-derived group (e.g., urethane group or urea group) and at least one hydrocarbon group having at least 16 carbon atoms has at least one of the following formulas:

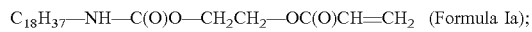

$$C_{18}H_{37}\text{—NH—C(O)O—CH}_2\text{CH}_2\text{—OC(O)CH}=\text{CH}_2 \quad \text{(Formula Ia);}$$

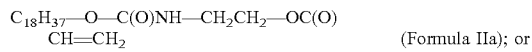

$$C_{18}H_{37}\text{—O—C(O)NH—CH}_2\text{CH}_2\text{—OC(O)}$$
$$\text{CH}=\text{CH}_2 \quad \text{(Formula IIa); or}$$

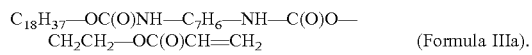

$$C_{18}H_{37}\text{—OC(O)NH—C}_7\text{H}_6\text{—NH—C(O)O—}$$
$$\text{CH}_2\text{CH}_2\text{—OC(O)CH}=\text{CH}_2 \quad \text{(Formula IIIa).}$$

Compounds of Formula Ia are within the scope of compounds of Formula I. Compounds of Formula IIa are within the scope of compounds of Formula II. Compounds of Formula IIIa are within the scope of compounds of Formula III, wherein Q in Formula III is an isocyanate residue derived from 2,4-toluenediisocyanate.

Techniques and conditions for making the (meth)acrylate monomers described herein would be well known to one of skill in the art. The preparation of certain urethane (meth)acrylate monomers is presented in the Examples Section. For example, a suitable (meth)acrylate monomer reactant (e.g., hydroxyethyl acrylate) and an isocyanate reactant (e.g., steraryl isocyanate) can be combined with or without an appropriate catalyst.

A catalyst in an appropriate amount (e.g., 500 ppm) may be used, but is not mandatory (particularly if higher temperatures are used). Exemplary catalysts include dibutyl tindilaurate (DBTDL) and bismuth neodecanoate (e.g., Shepherd Bicat 8108M, ABCR Bismuth (III) neodecanoate, superconductor grade, about 60% in neodecanoic acid (15-20% Bi), or Strem Chemicals Bismuth (III) neodecanoate, superconductor grade, about 60% in neodecanoic acid (15-20% Bi)).

The reaction to form a (meth)acrylate with at least one isocyanate-derived group can typically be carried out in a temperature range of 40° C. to 100° C., or 70° C. to 100° C., or 75° C. to 95° C. preferably under dry conditions (e.g., dry air). If no catalyst is used, a reaction temperature of 70° C. to 100° C. is preferred. Typically, the reaction is carried out in 1-24 hours, or 4-15 hours.

To prevent unwanted radical polymerization during the synthesis, a stabilizer in an appropriate amount (e.g., 50 to 500 ppm), such as 3,5-di-tert-butyl-4-hydroxy-toluene (BHT), 4-methoxyphenol (MOP), or hydroquinone (HQ) may be used, but is not mandatory.

Such (meth)acrylate monomers may be used to make functionalized oligomers (i.e., oligomers that contain a functional group capable of reacting with an isocyanate) by reaction with a mercaptan in a free-radical oligomerization.

In certain embodiments, the mercaptan is functionalized with at least one isocyanate-reactive group. In certain embodiments, the mercaptan is functionalized with at least one alcohol or amine group. In certain embodiments, the mercaptan is not functionalized.

Examples of mercaptans include mono- or di-functional hydroxyl- or amino-functionalized mercaptans (as chain transfer agents), in order to prepare mono- or di-functionalized oligomers, respectively. Examples of monofunctional mercaptans (as chain transfer agents) include 2-mercaptoethanol, 3-mercapto-2-butanol, 3-mercapto-2-propanol, 3-mercapto-1-propanol, and 2-mercapto-ethylamine. A particularly suitable monofunctional chain transfer agents is 2-mercaptoethanol. Examples of difunctional mercaptans (as chain transfer agents) include those having two hydroxyl or amino groups or one hydroxyl and one amino group. A suitable example of a difunctional chain transfer agent is 3-mercapto-1,2-propanediol (thioglycerol).

In certain embodiments non-functional mercaptans are used, i.e., mercaptans that do not contain an additional isocyanate-reactive group (e.g., a hydroxy group). In order to make a functionalized oligomer with such mercaptans, the non-functional mercaptan is reacted with a mixture of (meth)acrylates wherein at least one (meth)acrylate has a functional group capable of reacting with an isocyanate group. Examples of non-functionalized mercaptans include octylmercaptan, dodecylmercaptan, octadecylmercaptopropionate, and octadecylmercaptan. Examples of functionalized (meth)acrylate capable of undergoing a reaction with an isocyanate group are 2-hydroxyethyl(meth)acrylate, 3-hydroxypropyl(meth)acrylate, and 4-hydroxybutyl(meth)acrylate. Examples of functionalized oligomers made using non-functional mercaptans include the reaction product of 1 mole of octylmercaptan with 1 mole of 2-hydroxyethylacrylate and 11 moles of a monomer of Formula I, II, or III, or the reaction product of 1 mole of octadecylmercaptan with 1 mole of 4-hydroxybutylacrylate with 7 moles of a monomer of Formula I, II, or III.

In order to prepare the functionalized oligomers, a free-radical initiator may be used to initiate the oligomerization. Free-radical initiators include those known in the art and include, in particular, azo compounds such as 2,2'-azobis(2-methylbutyronitrile), 2,2'-azobisisobutyronitrile (AIBN) and 2,2'-azobis(2-cyanopentane), and the like, hydroperoxides such as cumene, t-butyl- and t-amyl-hydroperoxide, and the like, peroxyesters such as t-butylperbenzoate, di-t-butylperoxyphtalate, and the like, and diacylperoxides such as benzoyl peroxide, lauroyl peroxide, and the like.

The oligomerization reaction to form a functionalized (i.e., isocyanate-reactive) oligomer may be carried out in a wide variety of solvents suitable for organic free-radical reactions. Particularly suitable solvents are solvents that do not interfere with the isocyanate reactions in the subsequent step(s). The reactants can be present in the solvent at any suitable concentration, e.g., from about 5 percent to about 90 percent by weight, based on the total weight of the reaction mixture. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethylacetate, butylacetate), ketones (e.g., acetone, methylethyl ketone, methyl isobutyl ketone), and mixtures thereof.

The oligomerization reaction to form a functionalized (i.e., isocyanate-reactive) oligomer can be carried out at a temperature suitable for conducting a free-radical oligomerization reaction. Particular temperatures and solvents for use can be easily selected by those skilled in the art based on considerations such as the solubility of reagents, the temperature required for the use of a particular initiator, molecular weight desired, and the like. While it is not practical to enumerate a particular temperature suitable for all initiators and all solvents, generally suitable temperatures are 30° C. and 150° C. In certain embodiments, the temperature is 55° C. and 90° C., or 75° C. and 80° C. Reaction times typically are within 1 to 24 hours, and often within 4 to 15 hours.

In certain embodiments, the oligomer is made by the oligomerization of a mercaptan with a (meth)acrylate monomer comprising at least one isocyanate-derived group (e.g., a urethane group or a urea group) and at least one hydrocarbon group having at least 16 carbon atoms (and in some embodiments, up to 60 carbon atoms), wherein the molar ratio of the mercaptan with the (meth)acrylate is 1:4 to 1:20, or a molar ratio of the mercaptan with the (meth)acrylate is 1:8 to 1:16.

In certain embodiments, the oligomer has at least one of the following formulas:

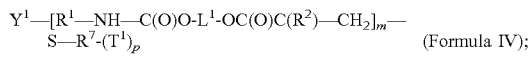

(Formula IV);

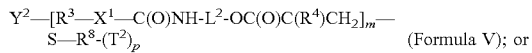

(Formula V); or

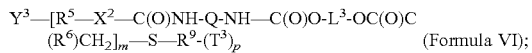

(Formula VI);

In Formulas IV, V, and VI, $Y^1$, $Y^2$, and $Y^3$, respectively, are independently H or an initiator residue. The initiator residue may be the residue of a free-radical initiator, such as azo compounds, such as 2,2'-azobis(2-methylbutyronitrile), 2,2'-azobisisobutyronitrile (AIBN) and 2,2'-azobis(2-cyanopentane) and the like, hydroperoxides such as cumene, t-butyl- and t-amyl-hydroperoxide, peroxyesters such as t-butylperbenzoate and di-t-butylperoxyphtalate, diacylperoxides such as benzoyl peroxide and lauroyl peroxide. For example, if the free radical initiator used in making the oligomers is 2,2'-azobis(2-methylbutyronitrile) (V-59 initiator), which has the following structure $H_3CH_2C$—$C(CH_3)(CN)$—$N$=$N$—$C(CH_3)(CN)$—$CH_2CH_3$, the residue is believed to be —$C(CH_3)(CN)$—$CH_2CH_3$, although there may be other fragments of the initiator forming the residue.

In Formulas IV, V, and VI, $R^1$, $R^3$, and $R^5$, respectively, are independently a hydrocarbon group having at least 16 carbon atoms (and in some embodiments, up to 60 carbon atoms or up to 30 carbon atoms), as described above in Formulas I, II, and III.

In Formulas IV, V, and VI, $R^2$, $R^4$, and $R^6$, respectively, are independently H or $CH_3$.

In Formulas IV, V, and VI, $L^1$, $L^2$, and $L^3$, respectively, are independently a branched or straight chain alkylene group having 2 to 10 carbon atoms, an arylene group (in certain embodiments, an arylene group having 5 to 12 carbon atoms), or a combination thereof, as described above in Formulas I, II, and III.

In Formulas V and VI, $X^1$ and $X^2$ are independently O, S, —NH, or —$N(R^{10})$, wherein $R^{10}$ is a hydrocarbon group (in certain embodiments, an alkyl group) having 1 to 20 carbon atoms, as described above in Formulas II and III.

In Formula VI, Q is a divalent isocyanate residue, as described above in Formula III.

In Formulas IV, V, and VI, each m is independently an integer of 2 to 20. In certain embodiments, m is an integer of 4 to 20.

In Formulas IV, V, and VI, $R^7$, $R^8$, and $R^9$ are independently a divalent or trivalent linking group having 1 to 10 carbon atoms.

In Formulas IV, V, and VI, $T^1$, $T^2$, and $T^3$ are is independently —OH, —$NH_2$, or —$NH(R^{11})$, wherein $R^{11}$ is H a hydrocarbon group (in certain embodiments, an alkyl group) having 1 to 10 carbon atoms.

In Formulas IV, V, and VI, each p is independently 1 or 2.

In Formulas IV, V, and VI, S is sulfur.

In certain embodiments, the oligomer has at least one of the following formulas:

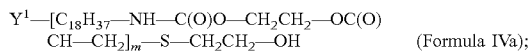

(Formula IVa);

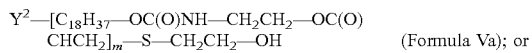

(Formula Va); or

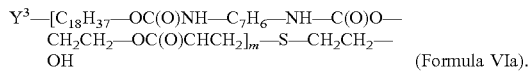

(Formula VIa).

In Formulas IVa, Va, and VIa, $Y^1$, $Y^2$, and $Y^3$ are independently an initiator residue as described above.

In Formulas IVa, Va, and VIa, each m is independently an integer from 4 to 20.

In Formulas IVa, Va, and VIa, S is sulfur.

Compounds of Formula IVa are within the scope of compounds of Formula IV. Compounds of Formula Va are within the scope of compounds of Formula V. Compounds of Formula VIa are within the scope of compounds of Formula VI.

Examples of oligomers of Formula IV include (SI-HOEA)$_8$, (SI-HOEA)$_{12}$, and (SI-HOPA)$_8$ wherein $Y^1$ is a residue of the V-59 initiator. The oligomer (SI-HOEA)$_8$ corresponds to the structure of Formula IVa ($Y^1$—[$C_{18}H_{37}$—NH—C(O)O—$CH_2CH_2$—OC(O)CH—$CH_2$]$_8$—S—$CH_2CH_2$—OH), (SI-HOEA)$_{12}$ corresponds to the structure of Formula IVa ($Y^1$—[$C_{18}H_{37}$—NH—C(O)O—$CH_2CH_2$—OC(O)CH—$CH_2$]$_{12}$—S—$CH_2CH_2$—OH), and (SI-HOPA)$_8$ corresponds to the structure of Formula IV ($Y^1$—[$R^1$—NH—C(O)O-$L^1$-OC(O)C($R^2$)—$CH_2$]$_m$—S—$R^7$-($T^1$)$_p$, wherein $R^1$=—$C_{18}H_{37}$, $L^1$=—$C_3H_6$—, $R^2$=H, m=8, $R^7$=—$CH_2CH_2$—, $T^1$=—OH, and p=1). Preparation and structure of the oligomers are further elaborated in the Examples Section.

Examples of oligomers of Formula V include (SA-AOI)$_8$ and (SA-MOI)$_8$. Oligomer (SA-AOI)$_8$ corresponds to structure of Formula Va ($Y^2$—[$C_{18}H_{37}$—OC(O)NH—$CH_2CH_2$—OC(O)CHCH$_2$]$_m$—S—$CH_2CH_2$—OH wherein m=8 and $Y^2$ is a residue of the V-59 initiator), oligomer (SA-MOI)$_8$ corresponds to the structure of Formula V ($Y^2$—[$R^3$—$X^1$—C(O)NH-$L^2$-OC(O)C($R^4$)$CH_2$]$_m$—S—$R^8$-($T^2$)$_p$, wherein $Y^2$ is a residue of the V-59 initiator, $R^3$=$C_{18}H_{37}$, $X^1$=O, $L^2$=—$CH_2CH_2$—, $R^4$=$CH_3$, m=8, $R^8$=—$CH_2CH_2$—, $T^2$=OH, and p=1). Preparation and structure of the oligomers are further elaborated in the Examples Section.

Examples of oligomers of Formula VI include (SA-TDI-HOEA)$_8$, where "TDI" in the oligomer is —$C_7H_6$— (i.e., the divalent isocyanate residue of TDI), which is Formula VIa wherein $Y^3$ is the residue of the V-59 initiator. Preparation and structure of the oligomers are further elaborated in the Examples Section.

Herein, acronyms, such as HOEA, SI, AOI, MOI, etc., are used both to represent the reactants (e.g., monomers) and the corresponding residues in the oligomers as a result of oligomerization.

In certain embodiments, the resultant oligomers include at least 70%, or at least 80%, or at least 85%, or at least 90%, or all of the repeating units include a hydrocarbon group having at least 16 carbon atoms (and in certain embodiments, up to 60 carbon atoms, or up to 30 carbon atoms).

In certain embodiments, the functionalized oligomers can be prepared by a free-radical oligomerization of (i) one or more ethylenically unsaturated monomers (e.g., (meth)acrylate monomers) having an isocyanate-derived group and a hydrocarbon chain having at least 16 carbon atoms, and (ii) one or more ethylenically unsaturated monomers having an isocyanate-derived group and a hydrocarbon chain having less than 16 carbon atoms, (iii) one or more ethylenically unsaturated monomers having no isocyanate-derived group, with a functionalized or non-functionalized mercaptan, with the proviso that the amount of monomers having an isocyanate-derived group and at least 16 carbon atoms is at least 70%, or at least 80%, or at least 85%, or at least 90%, or 100%, of the total amount of monomers.

In certain embodiments, at least 70%, or at least 80%, or at least 85%, or at least 90%, based on the total weight of the monomers, or all of the monomers, used to make the oligomers are (meth)acrylate monomers.

For example, in certain embodiments, the isocyanate-derived oligomer is made from at least 70 wt-% (meth)acrylate monomers having at least one isocyanate-derived group and at least one hydrocarbon group having at least 16 carbon atoms. In certain embodiments, all the (meth)acrylate monomers include at least one (typically, one) isocyanate-derived group and at least one (typically, one) hydrocarbon group having at least 16 carbon atoms.

Other monomers that could be copolymerized with the ethylenically unsaturated ((meth)acrylate monomers with isocyanate-derived and hydrocarbon groups, include, for example:
  a) monomers of Formulas I, II, and III, wherein $R^1$, $R^3$, and $R^5$ are hydrocarbon groups containing from 1 to 15 carbon atoms;
  b) other ethylenically unsaturated monomers such as olefinic hydrocarbons (including isoprene, butadiene, or chloroprene), vinyl-, allyl- or vinylidene-halides (including vinylidene chloride or vinyl chloride), styrene and its derivatives, vinyl esters (including vinylacetate), allylesters (including allylacetate), alkylvinyl, or alkylallylethers (including octadecylvinylether), nitriles (including acrylonitrile), maleate or itaconate esters (including di-octadecylitaconate), and (meth)acrylamides (including octadecyl acrylamide);
  c) (meth)acrylates not having an isocyanate linking group and a hydrocarbon group having at least 16 carbons, such as octadecyl acrylate, octadecyl methacrylate, behenyl acrylate and the like;
  d) (meth)acrylates not having an isocyanate derived linking group and a hydrocarbon group having less than 16 carbon atoms include 2-hydroxyethylacrylate, methyl (meth)acrylate, butyl(meth)acrylate, ethylhexyl(meth)acrylate, dodecyl(meth)acrylate, and the like.

In certain embodiments, the weight average molecular weight of the functionalized oligomers is at least 600, or at least 1500, or at least 2000 Daltons. In certain embodiments, the weight average molecular weight of the functionalized oligomers is up to 50,000, or up to 30,000, or up to 10,000 Daltons.

Condensation Reaction of Functionalized Oligomer to Form Isocyanate-Containing Oligomers In a second step, an isocyanate-containing oligomer (i.e., an isocyanate oligomer having at least one isocyanate end group) is prepared by a condensation reaction of the functionalized (i.e., isocyanate-reactive) oligomer with an excess of a polyisocyanate. The reaction product of such condensation reaction is typically a mixture of isocyanate-containing oligomers.

Polyisocyanates include di-isocyanates, tri-isocyanates, and higher functional isocyanates, including polymeric isocyanates. They may be aliphatic (including alicyclic) and cyclic (including aromatic). Examples of diisocyanates include 4,4'-methylenediphenylenediisocyanate (MDI), 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; cyclic diisocyanates such as isophorone diisocyanate (IPDI) and dicyclohexylmethane-4,4'-diisocyanate. Examples of triisocyanates include aliphatic triisocyanates such as 1,3,6-hexamethylenetriisocyanate and aromatic triisocyanates such as tri-(4-isocyanatophenyl)-methane. An example of a polymeric isocyanate includes polymethylenepolyphenylisocyanate (PAPI). An example of an aliphatic polyisocyanate is available under the tradename Desmodur N 100 from Bayer MaterialScience LLC, Pittsburgh, Pa., which is based on hexamethylene diisocyanate (HDI).

Particularly suitable isocyanates are aromatic isocyanates, including MDI and PAPI.

In addition to the functionalized (isocyanate-reactive) oligomer, at least one additional isocyanate-reactive compound may be used in making the isocyanate-containing oligomers.

Such additional isocyanate-reactive compounds may include: a hydrocarbon group having 2 to 60 carbon atoms; a polydimethylsiloxane segment having a weight average molecular weight of at least 200; a divalent polyoxyalkylene group comprising 2 to 100 alkylene oxide repeating units, wherein the alkyleneoxide unit has 2 to 10 carbon atoms; or a combination thereof.

Such additional isocyanate-reactive compounds are typically compounds containing one, two or more isocyanate-reactive groups and include mono-, di-, and poly-functional alcohols, thiols, and amines. The additional isocyanate-reactive compounds are non-fluorinated. A single compound or a mixture of different compounds may be used.

Examples include alkanols, such as methanol, ethanol, n-propylalcohol, isopropyl alcohol, n-butyl alcohol, isobutyl alcohol, t-butyl alcohol, n-amyl alcohol, t-amyl alcohol, 2-ethylhexanol, glycidol, (iso)stearyl alcohol, behenyl alcohol, branched long chain alkanols, such as Guerbet alcohols (2-alkyl alkanols having C-14 to C-32 alkyl chains, available from Sasol, Germany), alcohols comprising poly(oyalkylene) groups, such as methyl or ethyl ether of polyethyleneglycol, hydroxyl-terminated methyl or ethyl ether of random or block copolymer of ethyleneoxide and/or propyleneoxide and polysiloxane (e.g., polydimethylsiloxane) group-containing alcohols. Further examples include diols, triols, and polyols such as 1,4-butanediol, 1,6-hexanediol, 1-10-decanediol, 4,4'-isopropylidene diphenol (Bisphenol A), glycerol, pentaerythritol, dipentaerythritol; polyester diols, such as polycaprolactone diol, fatty acid dimer diols and poly(oxy)alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$—, and —OCH(CH$_3$)CH(CH$_3$)— (the oxyalkylene units in said poly(oxyalkylene) may be the same, as in polypropyleneglycol, or present as a mixture), and ester diols, such as glycerol monostearate and polysiloxane-containing (e.g., polydimethylsiloxane-containing) diols.

Further suitable isocyanate-reactive compounds include amino-containing compounds, such as octadecylamine, di(octadecyl)amine, 1,6-hexamethylenediamine, amino-terminated polyethyleneoxide or propyleneoxide or copolymers thereof, amino-terminated methyl or ethylethers of polyethyleneoxide or polypropyleneoxide or copolymers thereof and amino group-terminated polysiloxanes, for example, polydimethylsiloxanes.

Still further suitable isocyanate-reactive compounds include thiol-containing compounds, such as octadecylmercaptan, dodecylmercaptan, octadecylmercaptopropionate, 1,4-butanedithiol, and 1,6-hexanedithiol.

In certain embodiments, the additional isocyanate-reactive difunctional compound has the following formula:

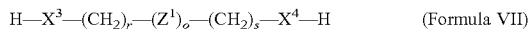  (Formula VII)

In Formula VII, $X^3$ and $X^4$ are independently S, —NH, —N($R^{10}$) or O, wherein $R^{10}$ is a hydrocarbon group (in certain embodiments, an alkyl group) having 1 to 20 carbon atoms. Examples of $R^{10}$ hydrocarbon groups include alkyl groups such as methyl, ethyl, decyl, octadecyl, and the like.

In Formula VII, r and s are independently integers from 1 to 12 (and in certain embodiments, 1 to 10).

In Formula VII, o is 0 or 1.

In Formula VII, $Z^1$ is selected from: a branched or straight chain alkylene group having 1 to 20 carbon atoms; a divalent polydimethylsiloxane group comprising 2 to 100 dimethylsiloxane repeating units; a divalent alkylene oxide group comprising 2 to 100 alkylene oxide repeating units; and a combination thereof. Examples of branched or straight chain alkylene groups include —$C_2H_4$—, —$C_3H_6$—, —$C_4H_8$—, and the like. Examples of divalent polydimethylsiloxane groups include —$CH_2CH_2CH_2(Si(CH_3)_2O)_q$—$CH_2CH_2CH_2$—, wherein q is an integer from 2 to 100. Examples of divalent alkylene oxide groups include —$(CH_2CH_2O)_q$—, wherein q is an integer from 2 to 100.

Examples of compounds of Formula VII include ethyleneglycol, 1,10-decanediol, 1,6-hexamethylenediamine, polyethyleneglycols with MW of 200 to 1000, and the like.

The isocyanate-reactive compounds may be used alone or in combination. An isocyanate-reactive compound can be present in an amount up to 50 mole-%, based on the total amount of isocyanate functionalities.

This second step of forming the isocyanate-containing oligomer by a condensation reaction may be carried out under conventional conditions well-known to those skilled in the art. In certain embodiments, the condensation reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are room temperature to 120° C.

In certain embodiments the condensation reaction is carried out without catalyst present. In certain embodiments the condensation reaction is carried out with catalyst present; these catalyst are well known to those skilled in the art and include, for example, tin-catalysts, such as dibutyltindilaurate or tinoctoate.

In certain embodiments, the weight average molecular weight of the isocyanate-containing oligomers is at least 600, or at least 1500, or at least 2000 Daltons. In certain embodiments, the weight average molecular weight of the isocyanate-containing oligomers is up to 50,000, or up to 30,000, or up to 10,000 Daltons.

The condensation reaction typically results in a mixture of isocyanate-containing oligomers. These compounds may be used directly in a treating composition of the present disclosure, or they may be blocked and then used in a treating composition of the present disclosure.

Optional Isocyanate Blocking Agents

In certain embodiments, the isocyanate-reactive oligomer(s) can be blocked to form blocked isocyanate groups. Such blocked isocyanate groups are the result of a reaction of an isocyanate blocking agent with an isocyanate group of the isocyanate-containing oligomers.

Such blocked isocyanates are particularly preferred because they impart a durable property when such blocked compound is applied to a fibrous substrate. This is generally because the blocking agent is removable from the isocyanate under the thermal conditions employed upon curing a fibrous substrate treated with a compound containing the blocked isocyanato group.

Conventional isocyanate blocking agents include arylalcohols (e.g., phenol, cresols, nitrophenols, o- and p-chlorophenol, naphthols, 4-hydroxybiphenyl); C2 to C8 alkanone oximes (e.g., acetone oxime, butanone oxime); arylthiols (e.g., thiophenol); organic active hydrogen compounds (e.g., diethyl malonate, acetylacetone, ethyl acetoacetate, ethyl cyanoacetate, epsilon-caprolactam); sodium bisulfite; and hydroxylamine.

Particularly preferred blocked isocyanates include those blocked with oxime isocyanate blocking agents such as C2 to C8 alkanone oximes, particularly butanone oxime. That is, preferred blocked isocyanate groups are oxime-derived groups. Such blocked isocyanates can be de-blocked at a relatively low temperature, for example, during the process of curing a fibrous substrate that has been treated with the compound comprising the blocked isocyanate group.

Various combinations of blocking agents can be used if desired to make compounds of the disclosure.

This blocking step of blocking the isocyanate-containing oligomer under conventional conditions is well-known to those skilled in the art. In certain embodiments, the blocking reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are room temperature to 120° C.

Treating Compositions

A treating composition that includes one or more isocyanate-containing or blocked isocyanate-containing oligomers, used as an aqueous composition, in particular, an aqueous dispersion in water.

After completion of the condensation and optional blocking reactions, the final reaction mixture may be dispersed in water using a surfactant or mixture of surfactants in an amount sufficient to stabilize the dispersion. The oligomers are usually made in solution in a solvent. They can be dispersed in water through vigorously mixing and homogenizing with the help of a surfactant or emulsifier and subsequent homogenization, for example, by a Manton Gaulin homogenizer or ultrasound homogenizer. An organic solvent-free dispersion can be obtained by subsequent distillation of the solvent.

A typical dispersion will contain water in an amount of 70 to 20000 parts by weight based on 100 parts by weight of isocyanate-containing or blocked isocyanate-containing oligomers or mixtures of such compounds. The surfactant or mixture of surfactants is preferably present in an amount of 1 to 25 parts by weight, or 5 to 15 parts by weight, based on 100 parts by weight of the isocyanate-containing or blocked isocyanate-containing oligomers or mixture of such compounds.

Treating compositions of the present disclosure can include conventional cationic, nonionic, anionic, and/or zwitterionic (i.e., amphoteric) surfactants (i.e., emulsifiers). A mixture of surfactants may be used, e.g., containing nonionic and ionic surfactants. Suitable nonionic surfactants can have high or low HLB values, such as TERGITOL's, TWEEN's, and the like. Suitable cationic surfactants include mono- or bi-tail ammonium salts. Suitable anionic surfactants include sulfonic and carboxylic aliphatic compounds and their salts, such as sodiumdodecylbenzenesulphonate (available from Rhodia, France), and the like. Suitable amphoteric surfactants include cocobetaines, sulphobetaines, amine-oxides, and the like.

In certain embodiments, surfactants suitable for use in the treating compositions of the present disclosure are described in International Publication No. WO 2013/162704.

A treating composition of the present disclosure may include at least one paraffin wax. In certain embodiments, the paraffin wax has a melting point of 40° C. to 75° C. In certain embodiments, the paraffin wax has a melting point of 60° C. to 75° C.

When present in a treating composition of the present disclosure, the total amount of one or more paraffin waxes is an amount of 30 wt-% to 70 wt-%, and the total amount of one or more isocyanate-containing or blocked isocyanate-containing oligomers or mixture of such compounds is an amount of 30 wt-% to 70 wt-%. In certain embodiments, the total amount of one or more paraffin waxes is an amount of 50 wt-% to 70 wt-%, and the total amount of one or more isocyanate-containing or blocked isocyanate-containing oligomers or mixture of such compounds is an amount of 30 wt-% to 50 wt-%. These amounts are based on the total weight of a treating composition (in a ready-to-use or a concentrated form).

Also, treating compositions of the present disclosure may further include one or more of a coalescing solvent, an anti-freeze solvent, an emulsifier, or a stabilizer against one or more microorganisms.

EXEMPLARY EMBODIMENTS

Embodiment 1 is a fluorine-free treating composition comprising:
one or more compounds derived from a reaction mixture comprising:
(i) at least one isocyanate-reactive oligomer comprising 2 to 20 repeating units;
(ii) at least one polyisocyanate;
(iii) optionally at least one additional isocyanate-reactive compound; and
(iv) optionally at least one isocyanate blocking agent;
wherein the isocyanate-reactive oligomer is made by the radical-initiated reaction of a reaction mixture comprising at least one mercaptan and at least one (meth)acrylate monomer, wherein the at least one (meth)acrylate monomer comprises at least one isocyanate-derived group and at least one hydrocarbon group having at least 16 carbon atoms (and in some embodiments, up to 60 carbon atoms).

Embodiment 2 is the fluorine-free composition of embodiment 1 wherein the isocyanate-derived oligomer is made from at least 70 wt-% (meth)acrylate monomers having at least one isocyanate-derived group and at least one hydrocarbon group having at least 16 carbon atoms, based on the total weight of monomers.

Embodiment 3 is the fluorine-free composition of embodiment 1 or 2 wherein the mercaptan is non-functionalized or is functionalized with at least one isocyanate-reactive group.

Embodiment 4 is the fluorine-free composition of embodiment 3 wherein the mercaptan is functionalized with at least one alcohol or amine group.

Embodiment 5 is the fluorine-free composition of any one of embodiments 2 through 4 wherein all the (meth)acrylate monomers comprise an isocyanate-derived group and a hydrocarbon group having at least 16 carbon atoms.

Embodiment 6 is the fluorine-free composition of any one of embodiments 1 through 5 wherein the isocyanate-reactive oligomer comprises a blocked isocyanate group.

Embodiment 7 is the fluorine-free composition of embodiment 6 wherein the blocked isocyanate group is an oxime-derived group.

Embodiment 8 is the fluorine-free composition of any one of embodiments 1 through 7 wherein the (meth)acrylate comprising an isocyanate-derived group and a hydrocarbon group having at least 16 carbon atoms has at least one of the following formulas:

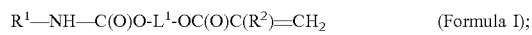  (Formula I);

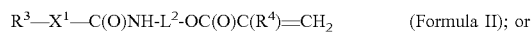  (Formula II); or

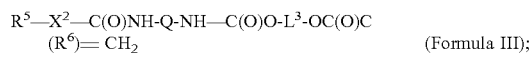  (Formula III);

wherein:
$R^1$, $R^3$, and $R^5$ are independently a hydrocarbon group having at least 16 carbon atoms (and in some embodiments, up to 60 carbon atoms);
$R^2$, $R^4$, and $R^6$ are independently H or $CH_3$;
$L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof;
$X^1$ and $X^2$ are independently O, S, —NH, or —N($R^{10}$), wherein $R^{10}$ is a hydrocarbon group having 1 to 20 carbon atoms; and
Q is a divalent isocyanate residue.

Embodiment 9 is the fluorine-free composition of embodiment 8 wherein the (meth)acrylate comprising at least one isocyanate-derived group and at least one hydrocarbon group having at least 16 carbon atoms has at least one of the following formulas:

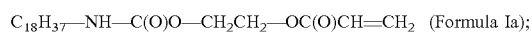

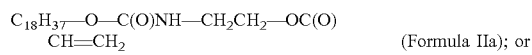

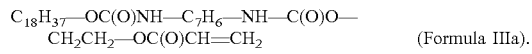

Embodiment 10 is the fluorine-free composition of any one of embodiments 1 through 6 wherein the oligomer comprises at least one of the following formulas:

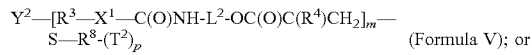

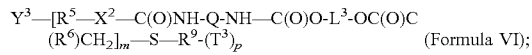

wherein:
$Y^1$, $Y^2$, and $Y^3$ are independently H or an initiator residue;
$R^1$, $R^3$, and $R^5$ are independently a hydrocarbon group having at least 16 carbon atoms (and in some embodiments, up to 60 carbon atoms) (in certain embodiments, $R^3$ and $R^5$ may be branched);
$R^2$, $R^4$, and $R^6$ are independently H or $CH_3$;
$L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof;

$X^1$ and $X^2$ are independently O, S, —NH, or —N($R^{10}$), wherein $R^{10}$ is a hydrocarbon group of 1 to 20 carbon atoms;

Q is a divalent isocyanate residue;

each m is independently an integer of 2 to 20;

$R^7$, $R^8$, and $R^9$ are independently a divalent or trivalent linking group having 1 to 10 carbon atoms;

$T^1$, $T^2$, and $T^3$ are is independently —OH, —$NH_2$, or —NH($R^{11}$), wherein $R^{11}$ is H a hydrocarbon group (in certain embodiments, an alkyl group) having 1 to 10 carbon atoms;

each p is independently 1 or 2; and

S is sulfur.

Embodiment 11 is the fluorine-free composition of embodiment 10 wherein the oligomer comprises at least one of the following formulas:

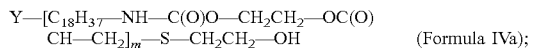  (Formula IVa);

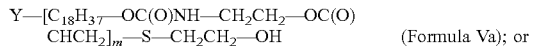  (Formula Va); or

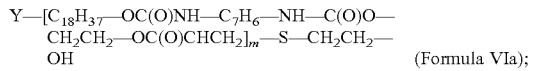  (Formula VIa);

wherein:

Y is H or an initiator residue;

m is an integer from 4 to 20; and

S is sulfur.

Embodiment 12 is the fluorine-free composition of any one of embodiments 1 through 11 wherein the polyisocyanate is an aliphatic diisocyanate, aromatic diisocyanate, an aromatic triisocyanate, an aromatic polymeric isocyanate, an aliphatic polymeric isocyanate, or a mixture thereof.

Embodiment 13 is the fluorine-free composition of any one of embodiments 1 through 12 further comprising at least one additional isocyanate-reactive compound.

Embodiment 14 is the fluorine-free composition of embodiment 13 wherein the additional isocyanate-reactive compound is a compound comprising:

a hydrocarbon group having 2 to 60 carbon atoms;

a polydimethylsiloxane segment having a weight average molecular weight of at least 200;

a divalent polyoxyalkylene group comprising 2 to 100 alkylene oxide repeating units, wherein the alkyleneoxide unit has 2 to 10 carbon atoms; or a combination thereof.

Embodiment 15 is the fluorine-free composition of any one of embodiments 1 through 14 wherein the reaction mixture for making the one or more compounds further comprises at least one isocyanate-reactive difunctional compound having the following formula:

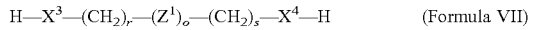  (Formula VII)

wherein:

$X^3$ and $X^4$ are independently O, S, —NH, or —N($R^{10}$), wherein $R^{10}$ is a hydrocarbon group having 1 to 20 carbon atoms;

r and s are independently integers from 1 to 12;

o is 0 or 1; and $Z^1$ is selected from:

a straight chain or branched alkylene group having 1 to 20 carbon atoms;

a divalent polydimethylsiloxane group comprising 2 to 100 dimethylsiloxane repeating units;

a divalent polyoxyalkylene group comprising 2 to 100 alkylene oxide repeating units, wherein each alkyleneoxide repeating unit independently has 2 to 10 carbon atoms; and a combination thereof.

Embodiment 16 is the fluorine-free composition of any one of embodiments 1 through 15 wherein the oligomer is made by the oligomerization of a mercaptan with a (meth) acrylate monomer comprising at least one isocyanate-derived group and at least one hydrocarbon group having at least 16 carbon atoms (and in some embodiments, up to 60 carbon atoms), wherein the molar ratio of the mercaptan with the (meth)acrylate is 1:4 to 1:20.

Embodiment 17 is the fluorine-free composition of embodiment 16 wherein the oligomer is made by the oligomerization of a mercaptan with a (meth)acrylate monomer comprising at least one isocyanate-derived group and at least one hydrocarbon group having at least 16 carbon atoms (and in some embodiments, up to 60 carbon atoms), wherein the molar ratio of the mercaptan with the (meth)acrylate is 1:8 to 1:16.

Embodiment 18 is the fluorine-free composition of any one of embodiments 1 through 17 wherein the oligomer is made by the oligomerization of a mercaptan with a (meth) acrylate monomer comprising a urethane group and a hydrocarbon group having at least 16 carbon atoms (and in some embodiments, up to 60 carbon atoms), wherein the molar ratio of the mercaptan with the (meth)acrylate is 1:4 to 1:20.

Embodiment 19 is the fluorine-free composition of any one of embodiments 1 through 17 wherein the oligomer is made by the oligomerization of a mercaptan with a (meth) acrylate monomer comprising a urea group and a hydrocarbon group having at least 16 carbon atoms (and in some embodiments, up to 60 carbon atoms), wherein the molar ratio of the mercaptan with the (meth)acrylate is 1:4 to 1:20.

Embodiment 20 is the fluorine-free composition of any one of embodiments 1 through 19 wherein the composition is an aqueous dispersion optionally comprising one or more additives selected from a surfactant, a coalescing solvent, an anti-freeze solvent, an emulsifier, and a stabilizer against one or more microorganisms.

Embodiment 21 is a fluorine-free compound prepared by reacting components comprising:

(i) at least one functionalized oligomer;

(ii) at least one aromatic polyisocyanate; and (iv) at least one oxime isocyanate blocking agent;

wherein the functionalized oligomer comprises at least one of the following formulas:

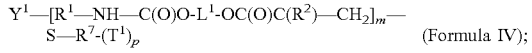  (Formula IV);

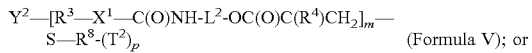  (Formula V); or

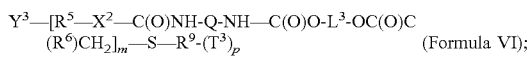  (Formula VI);

wherein:

$Y^1$, $Y^2$, and $Y^3$ are independently H or an initiator residue;

$R^1$, $R^3$, and $R^5$ are independently a hydrocarbon group having at least 16 carbon atoms (and in some embodiments, up to 60 carbon atoms);

$R^2$, $R^4$, and $R^6$ are independently H or $CH_3$;

$L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof;

$X^1$ and $X^2$ are independently O, S, —NH, or —N($R^{10}$), wherein $R^{10}$ is a hydrocarbon group of 1 to 20 carbon atoms;

Q is a divalent isocyanate residue;

each m is independently an integer of 2 to 20;

$R^7$, $R^8$, and $R^9$ are independently a divalent or trivalent linking group having 1 to 10 carbon atoms;

$T^1$, $T^2$, and $T^3$ are is independently —OH, —NH$_2$, or —NH($R^{11}$), wherein $R^{11}$ is H a hydrocarbon group (in certain embodiments, an alkyl group) having 1 to 10 carbon atoms;

each p is independently 1 or 2; and

S is sulfur.

Embodiment 22 is a method of treating a fibrous substrate comprising applying to the fibrous substrate a composition of any one of embodiments 1 through 20 in an amount sufficient to make the fibrous substrate water repellent (and in certain embodiments, durably water repellent).

Embodiment 23 is a fibrous substrate treated by the method of embodiment 22.

Embodiment 24 is the fibrous substrate of embodiment 23 which is selected from the group of textile, leather, carpet, paper, and nonwoven fabrics.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials List

| Material | Description | Source |
|---|---|---|
| ODA | Octadecyl acrylate, monomer | Sigma-Aldrich, Belgium |
| 2-mercaptoethanol | 2-mercaptoethanol, chain transfer agent | Sigma-Aldrich, Belgium |
| thioglycerol | 3-mercapto-1,2-propanediol, chain transfer agent | Sigma-Aldrich, Belgium |
| ODMP | octadecyl 3-mercaptopropionate | Evans Chemetics LP, Teaneck, NJ |
| V-59 | 2,2'-Azobis(2-methylbutyronitrile), initiator | Commercially available under the trade designation "VAZO V-59" from Wako Pure Chemical Industries, Ltd., Germany |
| VAZO-67 | Azonitrile free radical initiator | Commercially available under the trade name "VAZO-67" from DuPont, Wilmington, DE |
| ethylacetate | ethylacetate, solvent | Sigma-Aldrich, Belgium |
| MIBK | methylisobutyl ketone, solvent | Sigma-Aldrich, Belgium |
| toluene | toluene, solvent | Sigma-Aldrich, Belgium |
| BA | Behenyl alcohol, reactant | Sigma-Aldrich, Belgium |
| LA | Lauryl alcohol, dodecanol, reactant | Sigma-Aldrich, Belgium |
| SA, stearylalcohol | Octadecyl alcohol, reactant | Sigma-Aldrich, Belgium |
| SAm | Octadecyl amine, reactant | Sigma-Aldrich, Belgium |
| Guerbet 32 alcohol | 2-tetradecyloctadecanol (32), reactant | Commercially available under the trade designation "ISOFOL 32" from Sasol, Germany. |
| PAPI | Low Viscosity Polymethylene Polyphenylisocyanate | Commercially available under the trade designation "Voronate M 220" from Dow Chemical, Netherlands |
| DBTDL | Dibutyltin dilaurate, catalyst | Sigma-Aldrich, Belgium |
| AOI | isocyanatoethylacrylate | Showa Denko, Japan |
| MOI | isocyanatoethylmethacrylate | Showa Denko, Japan |
| MEKO | 2-butanoneoxime, blocking agent | Sigma-Aldrich, Belgium |
| Armocare VGH-70 | Ester based quaternary, emulsfier | Commercially available under the trade designation "Armocare VGH-70" from Akzo Nobel, Stenungsund, Sweden |
| Ethoquad C-12 | Quaternized coco amine ethoxylate, emulsifier | Commercially available under the trade designation "Ethoquad C-12" from Akzo Nobel, Stenungsund, Sweden |
| Arquad 12-50 | Dodecyl triemethyl ammonium chloride | Commercially available under the trade designation "Arquad 12-50" from Akzo Nobel, Stenungsund, Sweden |
| Tergitol TMN-6 | Nonionic emulsifier | Dow Chemical, Midland, MI |

-continued

| Material | Description | Source |
|---|---|---|
| Tergitol 15-S-30 | Nonionic emulsifier | Dow Chemical, Midland, MI |
| SI, stearyl isocyanate | octadecyl isocyanate | Sigma-Aldrich, Belgium |
| BI, butyl isocyanate | butyl isocyanate | Sigma-Aldrich, Belgium |
| HOEA | 2-hydroxyethyl acrylate, monomer | Sigma-Aldrich, Belgium |
| HEMA | 2-hydroxyethyl methacrylate, monomer | Sigma-Aldrich, Belgium |
| HOBA | 4-hydroxbutyl acrylate, monomer | Sigma-Aldrich, Belgium |
| HOPA | 3-hydroxypropyl acrylate, monomer | Sigma-Aldrich, Belgium |
| DDA | Dodecyl acrylate, lauryl acrylate | Sigma-Aldrich, Belgium |
| Unilin 350 | Fully saturated, long chain, linear primary alcohol with hydroxyl number of 129, Reactant. | Commercially available under the trade designation "UNILIN 350" from Baker Hughes, France |
| MDI | 4,4'-methylenebis(phenyl isocyanate) | Sigma-Aldrich, Belgium |
| TDI | 2,4-toluene diisocyanate | Commercially available under the trade designation "Desmodur T-100 TDI" from Bayer Material Science AG, Leverkusen, Germany |
| X-22-170A | Polydimethylsiloxane (PDMS) single end carbinol, equivalent weight 1806 | Commercially available under the trade designation "X-22-170A" from Shin-Etsu, Japan |
| X-22-170D | PDMS-diol, equivalent weight 2240 | Commercially available under the trade designation "X-22-170D" from Shin-Etsu, Japan |
| KF-6001 | PDMS diol, equivalent weight 900 | Commercially available under the trade designation "KF-6001" from Shin-Etsu, Japan |
| IM-11 | PDMS diol, weight average molecular weight 1120 | Commercially available under the trade designation "IM-11" from Wacker Chemie, Germany |
| M 200 | POLYMETHYLENE POLYPHENYL ISOCYANATE (COSMONATE M 200). | Mitsui Chemicals Polyurethanes Inc, Tokuyo, Japan |
| PES Microfiber | Polyester fabric | Chyang Sheng Dyeing and Finishing Company Ltd., Taiwan |
| PA Microfiber | Polyamide fabric, style 6145 | Sofinal NV, Belgium |
| NTD | Taslan Dobby Nylon 115 g/m². Characterized by the manufacturer as 70D*160D/166T*83T. Dyed and prepared for finishing | China |
| PPP | Poly Pongee Polyester. 84 g/m². Characterized by the manufacturer as 75D*75D/145T*90T Dyed and prepared for finishing | China |
| EG | Ethyleneglycol | Sigma-Aldrich, Belgium |
| HAD | 1,6-hexanediamine | Sigma-Aldrich, Belgium |
| ODT | Octadecane thiol | Sigma-Aldrich, Belgium |
| N100 | DESMODUR N-100 | Bayer AG, Germany |

Test Methods

Spray Rating (SR)

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and is expressed in terms of a 'spray rating' of the tested substrate. The spray rating was obtained by spraying 250 milliliters (mL) water on the substrate from a height of 15 centimeters (cm). The wetting pattern is visually rated using a 0 to 100 scale, where 0 means complete wetting and 100 means no wetting at all. Spray rating was measured initially and after the fabric was laundered 5, 10, or 20 times (designated as 5 L, 10 L, or 20 L, respectively).

The laundering procedure consisted of placing a 400-900 cm² sheet of treated substrate in a washing machine (Miele Novotronic T490) along with ballast sample (1.9 killogram (kg) of 8-ounce fabric). A commercial detergent ("Sapton," available from Henkel, Germany, 46 grams (g)) was added. The substrate and ballast load were washed using a short wash cycle at 40° C., followed by a rinse cycle and centrifuging. The sample was not dried between repeat cycles. After the required number of cycles the textile samples were dried in a Miele T-356 tumble drier, setting 'Extra dry,' and ironed at 180° C. during 3 seconds. The samples were conditioned overnight at room temperature before the spray rating was tested.

Treatment Procedure Via "Padding" Process

The treatments were applied onto the textile substrates, by immersing the substrates in the treatment dispersion and agitating until the substrate was saturated. The saturated substrate was then run through a padder/roller to remove excess of the dispersion and to obtain a certain Percent (%) Wet Pick Up (WPU) (100% WPU means that after this process the substrate absorbed 100% of its own weight of the treatment dispersion before drying). Drying was done as indicated in the examples.

EXAMPLES

Preparation of Urethane (Meth)acrylate Monomers

SI-HOEA Made from Stearyl Isocyanate and 2-hydroxyethyl Acrylate

In a 1-liter round-bottomed 3-necked reaction flask, 295.5 g of stearyl isocyanate (SI) (1 mole) was mixed with 116 g of 2-hydroxyethyl acrylate (HOEA) (1 mole). At room temperature a clear solution was obtained. The reaction quickly started after the addition of 5 drops of DBTDL, the temperature of the reaction mixture spontaneously increased, and a white insoluble material started to form in the mixture. Temperature was raised to 80° C. and the reaction was continued for 3 hours (hrs) at 80° C. After this period, the FTIR (Fourier Transform Infrared) spectrum showed all NCO disappeared. The structure of the final material was confirmed by NMR (Nuclear Magnetic Resonance) to be $C_{18}H_{37}NHC(O)OCH_2CH_2OC(O)CH=CH_2$, which is Formula Ia. At room temperature a hard solid waxy material was obtained, referenced as "SI-HOEA."

SI-HEMA. SI-HOBA. SI-HOPA. SI-HEMA: Made from Stearyl Isocyanate and Hydroxyalkyl (meth)acrylates With the same procedure as for "SI-HOEA," stearyl isocyanate was reacted with different hydroxy functional (meth)acrylates: 2-hydroxyethyl methacrylate (resulting in SI-HEMA, the structure confirmed by NMR to be $C_{18}H_{37}NHC(O)OCH_2CH_2OC(O)C(CH_3)=CH_2$ which is Formula I where $R^1$ is $—C_{18}H_{37}$, $R^2$ is $—CH_3$, $L^1$ is $—CH_2CH_2—$), 4-hydroxybutyl acrylate (resulting in SI-HOBA, the structure confirmed by NMR to be $C_{18}H_{37}NHC(O)O(CH_2)_4OC(O)CH=CH_2$, which is Formula I where $R^1$ is $C_{18}H_{37}$, $R^2$ is H, $L^1$ is $(CH_2)_4$), 3-hydroxypropyl acrylate (resulting in SI-HOPA, the structure confirmed by NMR to be $C_{18}H_{37}NHC(O)O(CH_2)_3OC(O)CH=CH_2$ which is Formula I where $R^1$ is $—C_{18}H_{37}$, $R^2$ is H, $L^1$ is $—(CH_2)_3—$).

BI-HOEA Made from Butyl Isocyanate and 2-hydroxyethyl acrylate

With the same procedure as for "SI-HOEA," butyl isocyanate (BI) was reacted with 2-hydroxyethyl acrylate (resulting in BI-HOEA, the structure confirmed by NMR to be $CH_3(CH_2)_3NHC(O)OCH_2CH_2OC(O)CH=CH_2$ which is Formula I where $R^1$ is $CH_3(CH_2)_3—$, $R^2$ is H, and $L^1$ is $—CH_2CH_2—$).

SA-TDI-HOEA Made from Stearyl Alcohol, TDI and 2-hydroxyethyl Acrylate

In a 1-liter round-bottomed 3-necked reaction flask, 270.5 g stearyl alcohol (1 mole) was mixed with 174.2 g TDI (1 mole) and 374 g ethylacetate (60% solids). The temperature was increased to 40° C., the mixture became clear, a spontaneous exotherm to 50° C. took place, and some insoluble material was formed. Product mixture was kept at 45° C. overnight and a partially insoluble material was obtained (urethane isocyanate). Then, 116.1 g 2-hydroxyethyl acrylate (1 mole) and 3 drops DBTDL were added. Temperature was increased to reflux temperature for 6 hrs. After this reaction, the FTIR spectrum showed no NCO present in the mixture. The material is referenced as "SA-TDI-HOEA," the structure confirmed by NMR to be Formula IIIa or alternatively (same structure) Formula III where $X^2$ is O, $R^5$ is $—C_{18}H_{37}$, $R^6$ is H, $L^3$ is $—CH_2CH_2—$, and Q is the divalent isocyanate residue of TDI (i.e., $—C_7H_6—$).

BA-TDI-HOEA Made from Behenyl Alcohol, TDI and 2-hydroxyethyl acrylate

In a 250-mL three-necked flask were placed 65.2 g (0.2 mol) BA, 29.2 g (0.02 mol) TDI, and 35 g ethylacetate under a nitrogen atmosphere. The mixture was heated up to 60° C. and reacted overnight for 16 hrs. Then, 23.2 g (0.2 mol) HOEA and 1 drop DBTDL were added and the reaction continued for 5 hrs at 80° C. under nitrogen. A clear solution resulted. IR analysis indicated that all isocyanate groups were reacted. The material is referenced as "BA-TDI-HOEA," the structure confirmed by NMR to be Formula III where $X^2$ is O, $R^5$ is $—C_{22}H_{45}$, $R^6$ is H, $L^3$ is $—CH_2CH_2—$, and Q is the divalent isocyanate residue of TDI (i.e., $—C_7H_6—$).

SA-AOI Made from Stearyl Alcohol (SA) and Isocyanato Ethylacrylate (AOI)

In a 1-liter round-bottomed 3-necked reaction flask, 270.5 g stearyl alcohol (1 mole) was mixed with 141.12 g AOI (1 mole). At about 60° C. a clear solution was obtained, and 5 drops of DBTDL were added. The temperature of the reaction mixture spontaneously increased. Temperature was kept at 80° C. and the reaction was continued for 3 hrs at 80° C. After this period, the FTIR spectrum showed all NCO disappeared. The monomer is referenced as "SA-AOI," the structure confirmed by NMR to be Formula IIa or alternatively (same structure) Formula II where $X^1$ is O, $R^3$ is $—C_{18}H_{37}$, $R^4$ is H, and $L^2$ is $—CH_2CH_2—$.

SA-MOI Made from Stearyl Alcohol (SA) and Isocyanatoethyl Methacrylate (MOI)

With the same procedure described under "SA-AOI" stearyl alcohol was reacted with MOI. The monomer is referenced as "SA-MOI" the structure confirmed by NMR to be Formula II where $X^1$ is O, $R^3$ is $—C_{18}H_{37}$, $R^4$ is $—CH_3$, and $L^2$ is $—CH_2CH_2—$.

BA-AOI Made from Behenyl Alcohol (BA) and Isocyanatoethyl Acrylate (AOI)

With the same procedure described under "SA-AOI" behenyl alcohol was reacted with AOI. The monomer is referenced as "BA-AOI" the structure confirmed by NMR to be Formula II where $X^1$ is O, $R^3$ is $—C_{22}H_{45}$, $R^4$ is H, and $L^2$ is $—CH_2CH_2—$.

Preparation of Functionalized (Meth)acrylate Oligomers $(ODA)_{12}$

In a 1-liter round-bottomed 3-necked reaction flask, 324 g (1 mole) of octadecyl acrylate monomer was mixed with 6.5 g (1/12 mole) of 2-mercaptoethanol, 110 g ethylacetate, and 0.8 g V-59 initiator. The mixture was heated to reflux temperature, and a clearly visible exotherm was observed, the reaction was continued for 2 hrs at reflux temperature. Then, an additional 0.8 g of V-59 was added and the reaction continued at reflux temperature overnight. When cooled to room temperature a solid white waxy material was obtained at 75% solids in ethylacetate with a theoretical MW of 3966, the structure confirmed by NMR to be an average of a 12 unit oligomer of ODA. $(ODA)_{12}$ is a hydroxy-endcapped oligomer containing in average 12 repeating units of octadecylacrylate $(Y^1—(ODA)_{12}-S—CH_2CH_2—OH$, wherein $Y^1$ is the residue of the V-59 initiator).

(SI-HOEA)$_8$

In a 1-liter round-bottomed 3-necked reaction flask, 411.5 g (1 mole) of SI-HOEA monomer was mixed with 9.75 g (1/8 mole) of 2-mercaptoethanol, 140 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 3370, the structure confirmed by NMR to be Formula IVa where m is an average of 8 and $Y^1$ is the residue of the V-59 initiator.

(SI-HOEA)$_4$

In a 1-liter round-bottomed 3-necked reaction flask, 411.5 g (1 mole) of SI-HOEA monomer was mixed with 19.5 g (1/4 mole) of 2-mercaptoethanol, 143.6 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 1724, the structure confirmed by NMR to be Formula IVa where m is an average of 4 and $Y^1$ is the residue of the V-59 initiator.

(SI-HOEA)$_6$

In a 1-liter round-bottomed 3-necked reaction flask, 411.5 g (1 mole) of SI-HOEA monomer was mixed with 13 g (1/6 mole) of 2-mercaptoethanol, 141.5 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 2547, the structure confirmed by NMR to be Formula IVa where m is an average of 6 and $Y^1$ is the residue of the V-59 initiator.

(SI-HOEA)$_{12}$

In a 1-liter round-bottomed 3-necked reaction flask, 411.5 g (1 mole) of SI-HOEA monomer was mixed with 6.5 g (1/12 mole) of 2-mercaptoethanol, 139.3 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 5016, the structure confirmed by NMR to be Formula IVa where m is an average of 12 and $Y^1$ is the residue of the V-59 initiator.

(SI-HOBA)$_8$

In a 1-liter round-bottomed 3-necked reaction flask, 439.7 g (1 mole) of SI-HOBA monomer was mixed with 9.75 g (1/8 mole) of 2-mercaptoethanol, 149.8 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 3596, the structure confirmed by NMR to be Formula IV where m is an average of 8, $R^1$ is —$C_{18}H_{37}$, $R^2$ is H, $R^7$ is —$CH_2CH_2$—, $T^1$ is —OH, p is 1, $L^1$ is —$CH_2CH_2CH_2CH_2$—, and $Y^1$ is the residue of the V-59 initiator.

(SI-HOPA)$_8$

In a 1-liter round-bottomed 3-necked reaction flask, 425.6 g (1 mole) of SI-HOPA monomer was mixed with 9.75 g (1/8 mole) of 2-mercaptoethanol, 145.1 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 3483, the structure confirmed by NMR to be Formula IV where m is an average of 8, $R^1$ is —$C_{18}H_{37}$, $R^2$ is H, $R^7$ is —$CH_2CH_2$—, $T^1$ is —OH, p is 1, $L^1$ is —$CH_2CH_2CH_2$—, and $Y^1$ is the residue of the V-59 initiator.

(SI-HOEMA)$_8$

In a 1-liter round-bottomed 3-necked reaction flask, 425.6 g (1 mole) of SI-HOEMA monomer was mixed with 9.75 g (1/8 mole) of 2-mercaptoethanol, 145.1 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 3483, the structure confirmed by NMR to be Formula IV where m is an average of 8, $R^1$ is —$C_{18}H_{37}$, $R^2$ is —$CH_3$, $R^7$ is —$CH_2CH_2$—, $T^1$ is —OH, p is 1, $L^1$ is —$CH_2CH_2$—, and $Y^1$ is the residue of the V-59 initiator.

(SA-AOI)$_8$

In a 1-liter round-bottomed 3-necked reaction flask, 411.6 g (1 mole) of SA-AOI monomer was mixed with 9.75 g (1/8 mole) of 2-mercaptoethanol, 140.5 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 3371, the structure confirmed by NMR to be Formula Va where m is an average of 8 and $Y^2$ is the residue of the V-59 initiator.

(SA-AOI)$_{12}$

In a 1-liter round-bottomed 3-necked reaction flask, 411.5 g (1 mole) of SI-AOI monomer was mixed with 6.5 g (1/12 mole) of 2-mercaptoethanol, 139.3 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 5016, the structure confirmed by NMR to be Formula Va where m is an average of 12 and $Y^1$ is the residue of the V-59 initiator.

A solid white waxy material was obtained at 75% solids in ethylacetate with a theoretical molecular weight (MW) of 5016, the structure confirmed by NMR to be Formula Va where m is an average of 12 and $Y^1$ is the residue of the V-59 initiator.

(SA-AOI/LA-AOI 80/20)$_{12}$

In a 1-liter round-bottomed 3-necked reaction flask were placed 395 g SA-AOI (0.96 mol), 78 g LA-AOI (0.24 mol), 150 g ethylacetate, and 7.8 g 2-mercaptoethanol (0.1 mol) and 0.8 g VAZO-67 initiator. The mixture was degassed using aspirator vacuum and nitrogen pressure. The mixture was warmed to about 70° C.; a vigorous exotherm was observed taking the temperature up to 86° C. The mixture was reacted for 3 hrs at 86° C. under nitrogen atmosphere. Then 0.2 g VAZO-67 was added and the reaction continued at 86° C. for 16 hrs. A clear solution was obtained containing the hydroxyfunctionalized oligomer of Formula V where m is an average of 12, $R^3$ is for 80% by mole is $C_{18}H_{37}$ and for 20% by mole is $C_{12}H_{25}$, $X^1$ is O, $L^2$ is —CH$_2$CH$_2$—, $R^4$ is H, $R^8$ is —CH$_2$CH$_2$—, $T^2$ is —OH, p is 1, and $Y^2$ is the residue of the VAZO-67 initiator.

(SA-AOI/DDA 80/20)$_{12}$

In a 1-liter round-bottomed 3-necked reaction flask, were placed 395 g SA-AOI (0.96 mol), 58 g DDA (0.24 mol), 150 g ethylacetate, and 7.8 g 2-mercaptoethanol (0.1 mol) and 0.8 g VAZO-67 initiator. The mixture was degassed using aspirator vacuum and nitrogen pressure. The mixture was warmed to about 70° C.; a vigorous exotherm was observed taking the temperature up to 86° C. The mixture was reacted for 3 hrs at 86° C. under nitrogen atmosphere. Then, 0.2 g VAZO-67 was added and the reaction continued at 86° C. for 16 hrs. A clear solution was obtained containing an isocyanate reactive oligomer comprising 12 repeating units.

SI-HOEA/HOEA/octylmercaptan (9/1/1)

In a 500-mL round-bottomed 3-necked reaction flask were placed 70.8 g SI (0.24 mol), 35 g ethylacetate, and 1 drop of DBTDL catalyst. The reaction mixture was heated up to 80° C. for 5 hrs under a nitrogen atmosphere. A clear solution of SI-HOEA monomer resulted. IR analysis indicated that all isocyanate had reacted. Then, 3.2 g HOEA (0.0266 mol), 3.9 g octylmercaptan (0.02666 mol) and 0.2 g VAZO-67 were added at 70° C. An exothermic reaction was observed and the temperature increased to about 87° C. After 3 hrs, another 0.05 g VAZO-67 was added and the reaction continued for 16 hrs at 85° C. A clear solution was obtained containing an isocyanate reactive oligomer comprising 9 repeating units.

(SA-MOI)$_8$

In a 1-liter round-bottomed 3-necked reaction flask, 425 g (1 mole) of SA-MOI monomer was mixed with 9.75 g (1/8 mole) of 2-mercaptoethanol, 144.9 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 3483, the structure confirmed by NMR to be Formula V where $X^1$ is O, $R^3$ is —C$_{18}$H$_{37}$, $R^4$ is —CH$_3$, Re is —CH$_2$CH$_2$—, $L^2$ is —CH$_2$CH$_2$—, $T^2$ is —OH, p is 1, m is an average of 8, and $Y^2$ is the residue of the V-59 initiator.

(BI-HOEA)$_8$

In a 1-liter round-bottomed 3-necked reaction flask, 215 g (1 mole) of BI-HOEA monomer was mixed with 9.75 g (1/8 mole) of 2-mercaptoethanol, 74.9 g ethylacetate, and 0.5 g V-59 initiator. The mixture was heated to reflux temperature, a clearly visible exotherm was observed and the reaction was continued for 2 hrs at reflux temperature. Then, an additional 0.5 g of V-59 was added and the reaction continued at reflux temperature overnight. When cooled to room temperature a solid white waxy material was obtained at 75% solids in ethylacetate with a theoretical molecular weight (MW) of 1798, the structure confirmed by NMR to be Formula IV where m is an average of 8, $R^1$ is CH$_3$CH$_2$CH$_2$CH$_2$—, $R^2$ is H, $R^7$ is —CH$_2$CH$_2$—, $T^1$ is —OH, p is 1, $L^1$ is —CH$_2$CH$_2$—, and $Y^1$ is the residue of the V-59 initiator.

(SA-TDI-HOEA)$_8$

In a 1-liter round-bottomed 3-necked reaction flask, 560.8 g (1 mole) of SA-TDI-HOEA monomer was mixed with 9.75 g (1/8 mole) of 2-mercaptoethanol, 190 g ethylacetate, and 1 g V-59 initiator. The mixture was heated to reflux temperature, a clearly visible exotherm was observed and the reaction was continued for 2 hrs at reflux temperature. Then, an additional 1 g of V-59 was added and the reaction continued at reflux temperature overnight. When cooled to room temperature a solid white waxy material was obtained at 75% solids in ethylacetate with a theoretical molecular weight (MW) of 4564, the structure confirmed by NMR to be Formula VIa where $C_7H_6$ is the divalent isocyanate residue of TDI and $Y^3$ is the residue of the V-59 initiator.

(BA-TDI-HOEA)$_{12}$

Using the same procedure as for (SA-TDI-HOEA)$_8$, (BA-TDI-HOEA)$_{12}$ was prepared. (BA-TDI-HOEA)$_{12}$ represents an reactive oligomer made out of reaction of 12 moles BA-TDI-HOEA with 1 mol of 2-mercaptoethanol and corresponding to formula V wherein $Y^3$ is the residue of the V-59 initiator, $R^3$ is —C$_{22}$H$_{45}$, $X^1$ is O, $L^2$ is —CH$_2$CH$_2$—, $R^4$ is H, $R^8$ is —CH$_2$CH$_2$—, $T^2$ is —OH, and p is 1.

Preparation of Blocked Urethanes

Preparation of (SI-HOEA)$_8$/SA/PAPI/MEKO (0.1/0.2/1/0.7)

In a 500-mL round-bottomed 3-necked reaction flask, 46.12 g (SI-HOEA)$_8$ oligomer (MW 3370) 75% in ethylacetate, 5.55 g stearyl alcohol (MW 270.5), 13.96 g PAPI (EW 136) and 78.5 g ethylacetate was mixed and reacted overnight at reflux temperature. Then, 5.9 g MEKO (MW 82.12) was added under stirring, and the mixture cooled. This resulted in a 40% solids urethane acrylate solution.

The 150 g solution prepared above was then dispersed in water by mixing it at 60° C. with a water phase, consisting of 154 g deionized (DI) water, 1.6 g Ethoquad C-12, 3.6 g Tergitol TMN-6, and 1.8 g Tergitol 15-S-30. This premix was then ultrasonicated with a 'Branson Sonifier' for 6 minutes (min) at maximum setting. The ethylacetate was then removed by vacuum distillation to result in a stable solvent free dispersion which was diluted to 30% solids with deionized water (DI-water). The material is referenced as (SI-HOEA)$_8$/SA/PAPI/MEKO (0.1/0.2/1/0.7) where the numbers in parentheses refer to the relative moles of the 4 reactants identified by the previously described acronyms. The material is a fluorine-free treating composition wherein the compound(s) are derived from a reaction mixture of:
  (i) an isocyanate reactive oligomer, having 8 repeating units, made by the radical initiated reaction of 1 mole of 2-mercaptoethanol and 8 moles of an acrylate monomer comprising a urethane group and a hydrocarbon group having 18 carbon atoms, SI-HOEA;
  (ii) a polymeric isocyanate, PAPI;
  (iii) a monomeric isocyanate reactive compound, stearyl alcohol, SA; and
  (iv) an isocyanate blocking agent, MEKO.

With exactly the same procedure, all the compounds of Table 1 were prepared with weights being adjusted for the MW of the oligomer.

Comparative Example A (CE A) and Examples 1-7

The polymer dispersions were applied to rain and outwear fabrics via the "Treatment Procedure via Padding Process," typically used in the textile industry. Before application to the fabric the 30% solids polymer dispersions were diluted with DI-water at a concentration of 20 g/liter. A dark grey polyester and grey polyamide microfiber fabric were treated with these impregnation baths ("wet pick up" WPU see Table 1). After application of the treatment solution, the fabrics were dried and cured for 2 min at 150° C. and conditioned overnight at room temperature before testing. The fabrics were tested for their dynamic water repellent properties via the "Spray Rating (SR)" test initially and after various launderings.

Comparative Example A is (BI-HOEA)$_8$/SA/PAPI/MEKO (0.1/0.2/1/0.7) prepared as (SI-HOEA)$_8$/SA/PAPI/MEKO (0.1/0.2/1/0.7) but using the shorter butyl groups in place of longer stearyl groups. Examples 1-7 in Table 1 all used the same 0.1/0.2/1/0.7 relative mole ratios of the respective reactants (oligomer/SA/PAPI/MEKO) but used, respectively, (SI-HOEA)$_8$, (SI-HOBA)$_8$, (SI-HOPA)$_8$, (SI-HOEMA)$_8$, (SA-TDI-HOEA)$_8$, (SA-AOI)$_8$, (SA-MOI)$_8$ as the oligomer.

TABLE 1

Spray Ratings

| Example | PES (100% WPU) Initial | PA (93% WPU) Initial | PES 10LD | PA 10LD | PES 20LD | PA 20LD |
|---|---|---|---|---|---|---|
| CE A | 70 | 70 | 0 | 0 | NT | NT |
| EX 1 | 100 | 100 | 100 | 100 | 100 | 100 |
| EX 2 | 100 | 100 | 100 | 100 | 100 | 100 |
| EX 3 | 100 | 100 | 80 | 100 | 70 | 100 |
| EX 4 | 100 | 100 | 90 | 100 | 90 | 100 |
| EX 5 | 100 | 100 | 85 | 90 | 75 | 70 |
| EX 6 | 100 | 100 | 100 | 100 | 100 | 90 |
| EX 7 | 100 | 100 | 100 | 100 | 90 | 80 |

Comparative Examples B and C (CE B, CE C) and Example 8

Comparative Example B is a water based dispersion of a comparative material made according to Example 1 of JP 2010/132844 and based on behenyl acrylate. Behenyl acrylate (21.08 g/55.47 mmol), thioglycerol (1.00 g/9.25 mmol) and V-59 (0.11 g in 33.12 g MEK) were placed in a 100 mL glass ampule. The ampule was sealed and placed in an incubator at 65 degrees C. for 24 hrs to produce a 6:1 mole ratio of behenyl acrylate to thioglycerol. The reacted contents were then placed in another 100 mL glass ampule with 0.03 g DBTDL in 2.94 g MEK and 44.74 g of M-200.

The ampule was sealed under nitrogen and reacted in an incubator at 70° C. for 2 hrs. Then the ampule was opened, 1.29 g MEKO was added, the ampule resealed under nitrogen and placed back in the incubator at 70° C. for 21 hrs. FT-IR verified that the NCO peak disappeared.

Comparative Example C is a comparative example made in the same way as Comparative Example B but based on octadecyl acrylate instead of behenyl acrylate. Example 8 is made in the same way as Comparative Example B, but based on SI-HOEA instead of behenyl acrylate. Comparative Examples B and C and Example 8 were dispersed in water and applied to textile with the same procedure as used for Examples 1 to 7.

Example 8 is a fluorine-free treating composition wherein the compound(s) are derived from a reaction mixture of:
(i) an isocyanate reactive oligomer, having 6 repeating units, made by the radical initiated reaction of 1 mole of thioglycerol and 6 moles of an acrylate monomer comprising a urethane group and a hydrocarbon group having 18 carbon atoms, SI-HOEA;
(ii) a polymeric isocyanate, PAPI; and
(iv) an isocyanate blocking agent, MEKO.

TABLE 2

Spray Ratings

| Example | PES (100% WPU) Initial | PA (93% WPU) Initial |
|---|---|---|
| CE B | 70 | 70 |
| CE C | 70 | 70 |
| EX8 | 100 | 100 |

Examples 9-16

Example 9 was made without MEKO blocking group (SI-HOEA)8/SA/PAPI (0.5/0.5/1). Example 9 is a fluorine-free treating composition wherein the compound(s) are derived from a reaction mixture of:
(i) an isocyanate reactive oligomer, having 8 repeating units, made by the radical initiated reaction of 1 mole of 2-mercaptoethanol and 8 moles of an acrylate monomer comprising a urethane group and a hydrocarbon group having 18 carbon atoms, SI-HOEA;
(ii) a polymeric isocyanate, PAPI; and
(iii) a monomeric isocyanate reactive compound, stearyl alcohol, SA.

Examples 10 to 16 are all made with the same procedures to prepare the oligomers, urethane solutions and dispersions as described previously. The application to textile was done as described in the earlier examples as well. Example 10 is made without using stearyl alcohol: (SI-HOEA)$_{12}$/PAPI/MEKO (0.2/1/0.8).

Example 10 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms, SI-HOEA;
(ii) a polymeric isocyanate, PAPI; and
(iv) an isocyanate blocking agent, MEKO.

Examples 11 to 14 are made with different oligomer alcohol chain lengths (n=4, 6, 8, 12) and almost identical weight ratios (oligomer/SA/PAPI/MEKO of 0.66/0.07/0.20/0.08), with molar ratios (0.25/0.15/1/0.6), (0.18/0.17/1/0.65), (0.15/0.2/1/0.65), (0.1/0.2/1/0.7), respectively.

Examples 15 and 16 are made with urethane (meth)acrylate monomers prepared from stearyl alcohol.

Examples 11 to 14 are fluorine-free treating compositions wherein the compound(s) are derived from a reaction mixture of:
(i) an isocyanate reactive oligomer, having 4, 6, 8, and 12 repeating units, respectively, made by the radical initiated reaction of 1 mole of 2-mercaptoethanol and 4, 6, 8, and 12 moles of an acrylate monomer comprising a urethane group and a hydrocarbon group having 18 carbon atoms, SI-HOEA;
(ii) a polymeric isocyanate, PAPI;

(iii) a monomeric isocyanate reactive compound, stearyl alcohol, SA; and
(iv) an isocyanate blocking agent, MEKO.

TABLE 3

Spray Ratings

| Example | PES (100% WPU) Initial | PA (93% WPU) Initial | PES 10LD | PA 10LD | PES 20LD | PA 20LD |
|---|---|---|---|---|---|---|
| EX 9  | 100 | 100 | 80  | 70  | 70  | 50  |
| EX 10 | 100 | 100 | 100 | 100 | 100 | 100 |
| EX 11 | 100 | 100 | 100 | 100 | 100 | 80  |
| EX 12 | 100 | 100 | 100 | 100 | 100 | 90  |
| EX 13 | 100 | 100 | 100 | 100 | 100 | 100 |
| EX 14 | 100 | 100 | 100 | 100 | 100 | 100 |
| EX 15 | 100 | 100 | 100 | 100 | 90  | 80  |
| EX 16 | 100 | 100 | 100 | 100 | 100 | 90  |

Comparative Examples D-G and Example 17

Example 17 (SI-HOEA)$_{12}$/SA/PAPI/MEKO (0.1/0.2/1/0.7) is made with the same procedure to prepare the oligomer, urethane solution, and dispersion as described previously. Example 17 and Comparative Examples D-G are applied to textile with the same method as used for the earlier examples. Comparative Example D is a fluorochemical water-repellant material commercially available from 3M, St. Paul, Minn. as described in international Publicaiton No. WO 2013/162704, Example 1. Comparative Examples E and F are competitive commercially available fluorine free water repellant materials sold under the trade designations "PHOBOL RSH and "PHOBOTEX RHW," respectively, from Huntsman Textile Effects, Singapore. Comparative Example G is a commercial fluorine free product for high durability water repellent finishes available under the trade designations "FREEPEL 1225" from Emerald Performance Materials, Cuyahoga Falls, Ohio. These results clearly demonstrate that the materials of this invention outperform commercially available fluorine-free water repellant materials, and even a state of the art fluorochemical material.

TABLE 4

Spray Ratings

| Example | PES (100% WPU) Initial | PA (93% WPU) Initial | PES 10LD | PA 10LD | PES 20LD | PA 20LD |
|---|---|---|---|---|---|---|
| CE D  | 100 | 100 | 80  | 50  | 80 | 50  |
| CE E  | 100 | 100 | 70  | 0   | 0  | 0   |
| CE F  | 100 | 100 | 0   | 0   | 0  | 0   |
| CE G  | 100 | 100 | 50  | 0   | 0  | 0   |
| EX 17 | 100 | 100 | 100 | 100 | 100 | 100 |

Examples 18-19. Preparation of Long Chain Hydrocarbon Blocked Urethanes

Synthesis of UNILIN 350-AOI

In a 250-mL three-necked flask, fitted with a stirrer, cooler, thermometer and heating mantle were placed 86.8 g (0.2 mol) UNILIN 350 alcohol, 28.2 g (0.2 mol) AOI, 40 g ethylacetate, and 1 drop of DBTDL catalyst. The reaction was heated up to 80° C. for 5 hrs under nitrogen atmosphere. IR indicated that all isocyanate groups had reacted. A clear solution at 80° C. was obtained.

Synthesis of (UNILIN 350-AOI)$_{10}$

In a 250-mL three-necked flask fitted with a stirrer, cooler, thermometer and heating mantle were placed 115 g (0.2 mol) of above prepared "UNILIN 350-AOI" 1.6 g (0.02 mol) 2-mercaptoethanol, 50 g toluene, and 0.15 g VAZO-67 initiator. The mixture was degassed 3 times using vacuum and nitrogen pressure and then heated to 75° C. under nitrogen. The mixture exothermed to about 102° C. and the reaction was continued for about 3 hrs at 85° C. Then, 0.05 g VAZO-67 was added and the reaction was continued for 16 hrs at 85° C. A clear solution of an isocyanate reactive oligomer comprising 10 repeating units was obtained.

Example 18. Synthesis of (UNILIN 350-AOI)$_{10}$/SA/PAPI/MEKO (0.6/0.6/3/1.8)

In a 500-mL three-necked flask fitted with a stirrer, cooler, thermometer, and heating mantle was placed the toluene solution of the (UNILIN 350-AOI)$_{10}$ oligomer prepared above. All toluene was stripped off using aspirator vacuum at 80° C. Then, 120 g MIBK was added as well as 5.4 g (0.02 mol) SA. The mixture was warmed up to about 70° C. under nitrogen followed by addition of 13.6 g (0.1 equivalent) of PAPI and 1 drop of DBTDL catalyst. The mixture was heated up to 85° C. The clear solution was allowed to react for 16 hrs. Then, 5.2 g (0.06 mol) MEKO was added and the reaction was continued for 3 hrs at 85° C. A clear amber solution was obtained. IR analysis indicated that all isocyanate had reacted. The material of Example 18 is a fluorine-free treating composition wherein the compound(s) are derived from a reaction mixture of:
  (i) an isocyanate reactive oligomer, having 10 repeating units, made by the radical initiated reaction of 1 mole of 2-mercaptoethanol and 10 moles of an acrylate monomer comprising a urethane group and a hydrocarbon group having about 30 carbon atoms;
  (ii) a polymeric isocyanate, PAPI;
  (iii) a monomeric isocyanate reactive compound, stearyl alcohol, SA; and
  (iv) an isocyanate blocking agent, MEKO.

Example 19. (UNILIN 350-AOI)$_{10}$/BA/PAPI/MEKO (0.6/0.6/3/1.8)

Example 19 was prepared using the procedure of Example 18, but using behenyl alcohol (BA) instead of stearyl alcohol (SA). The material of Example 19 is a fluorine-free treating composition wherein the compound(s) are derived from a reaction mixture of:
  (i) an isocyanate reactive oligomer, having 10 repeating units, made by the radical initiated reaction of 1 mole of 2-mercaptoethanol and 10 moles of an acrylate monomer comprising a urethane group and a hydrocarbon group having about 30 carbon atoms;
  (ii) a polymeric isocyanate, PAPI;
  (iii) a monomeric isocyanate reactive compound, behenyl alcohol, BA; and
  (iv) an isocyanate blocking agent, MEKO.

Treatment of the textiles was done according to the procedures "Treatment Procedure via Padding Process" and "Spray Rating (SR)" with the following differences: the treatment bath contained 0.1% acetic acid and 1% isopropanol; cure after treatment was 2 mins at 175° C.; and fabrics were laundered at 40° C. and ironed at 180° C. for 3 seconds.

TABLE 5

Spray Ratings (add in level was 0.6% SOF (solid on fabric)

| Example | PES (76.4% WPU) Initial | PA (74.9% WPU) Initial | PES 10LD | PA 10LD | PES 20LD | PA 20LD |
|---|---|---|---|---|---|---|
| EX 18 | 100 | 100 | 80 | 80 | 85 | 80 |
| EX 19 | 100 | 100 | 90 | 80 | 90 | 80 |

Example 20. Synthesis of (SA-AOI)$_{12}$/SA/PAPI/MEKO (0.6/0.6/3/1.8)

In a three-necked flask of 250-mL fitted with a stirrer, heating mantle, cooler and thermometer were placed 54 g (0.2 mol) SA, 28.2 g AOI (0.2 mol), 35 g ethylacetate, and 1 drop of DBTDL. The reaction mixture was reacted for 5 hrs at 85° C. under nitrogen atmosphere. IR check showed that all isocyanate had reacted. The mixture was cooled to 60° C. and 1.3 g 2-mercaptoethanol (0.017 mol), and 0.2 g VAZO-67 were added. The mixture was degassed 3 times using aspirator vacuum and nitrogen and then heated up to about 70° C. A vigorous exotherm took off up to 88° C. The reaction was continued for 3 hrs at 85° C. under nitrogen. Then, 0.06 g VAZO-67 was added and the reaction continued for 16 hrs. A clear solution of the hydroxyl functionalized oligomer was obtained. The reaction mixture was diluted by using 60 g ethylacetate and cooled to 60° C. under nitrogen. Then, 7 g (0.051 equiv) of PAPI was added and reacted for 16 hrs at 85° C. As a last step, 3 g MEKO (0.034 mol) was added and reacted for 2 hrs at 82° C. IR analysis indicated that all isocyanate had reacted away. A clear, amber brown colored solution was obtained at 82° C.

The material of Example 20 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;
(ii) a polymeric isocyanate, PAPI;
(iii) a monomeric isocyanate reactive compound, stearyl alcohol, SA; and
(iv) an isocyanate blocking agent, MEKO.

Example 21. (BA-AOI)$_{12}$/BA/PAPI/MEKO (0.6/0.6/3/1.8)

Example 21 was made using the procedure of Example 20, but using behenyl alcohol (BA) instead of stearylalcohol (SA). The material of Example 21 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 22 carbon atoms;
(ii) a polymeric isocyanate, PAPI;
(iii) a monomeric isocyanate reactive compound, behenyl alcohol, BA; and
(iv) an isocyanate blocking agent, MEKO.

Example 22. (SA-MOI)$_{12}$/SA/PAPI/MEKO (0.6/0.6/3/1.8)

Example 22 was made using the procedure of Example 20, but using MOI instead of AOI. The material of Example 22 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of a methacrylate monomer comprising a urethane group and a hydrocarbon group having 18 carbon atoms;
(ii) a polymeric isocyanate, PAPI;
(iii) a monomeric isocyanate reactive compound, stearyl alcohol, SA; and
(iv) an isocyanate blocking agent, MEKO.

Example 23. (SAm-MOI)$_{12}$/SAm/PAPI/MEKO (0.6/0.6/3/1.8)

Example 23 was prepared using the procedure of Example 20, but using MOI instead of AOI, and octadecylamine (SAm) instead of stearylalcohol (SA). The material of Example 23 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of a methacrylate monomer comprising a urea group and a hydrocarbon group having 18 carbon atoms;
(ii) a polymeric isocyanate, PAPI;
(iii) a monomeric isocyanate reactive compound, stearyl amine, SAm; and
(iv) an isocyanate blocking agent, MEKO.

Example 24. (Guerbet 32 Alcohol-AOI)$_{12}$/Guerbet 32 Alcohol/PAPI/MEKO (0.6/0.6/3/1.8)

Example 24 was prepared using the procedure of Example 20, but using Guerbet 32 alcohol instead of stearylalcohol (SA). The material of Example 24 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 32 carbon atoms;
(ii) a polymeric isocyanate, PAPI;
(iii) a monomeric isocyanate reactive compound, Guerbet 32 alcohol; and
(iv) an isocyanate blocking agent, MEKO.

Example 25. Synthesis of (SA-AOI)$_{12}$/EG/PAPI/MEKO (0.6/0.3/3/1.8)

Example 25 was made using the procedure of Example 20, but using ethyleneglycol (EG) instead of stearylalcohol (SA). The material of Example 25 is a fluorine-free treating composition wherein the compound(s) are derived from a reaction mixture of:

(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;

(ii) a polymeric isocyanate, PAPI;

(iii) a divalent isocyanate reactive compound, ethyleneglycol, EG; and (iv) an isocyanate blocking agent, MEKO.

Example 26. (SA-AOI)$_{12}$/HAD/PAPI/MEKO (0.6/0.3/3/1.8)

Example 26 was made using the procedure of Example 20, but using 1,6 hexanediamine (HAD) instead of stearylalcohol (SA). The material of Example 26 is a fluorine-free treating composition wherein the compound(s) are derived from a reaction mixture of:

(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;

(ii) a polymeric isocyanate, PAPI;

(iii) a divalent isocyanate reactive compound, 1,6 hexanediamine, HAD; and (iv) an isocyanate blocking agent, MEKO.

Example 27. (SA-AOI)$_{12}$/ODT/PAPI/MEKO (0.6/0.6/3/1.8)

Example 27 was made using the procedure of Example 20, but using octadecanethiol (ODT) instead of stearylalcohol (SA). The material of Example 27 is a fluorine-free treating composition wherein the compound(s) are derived from a reaction mixture of:

(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;

(ii) a polymeric isocyanate, PAPI;

(iii) a monomeric isocyanate reactive compound, octadecanethiol, ODT; and (iv) an isocyanate blocking agent, MEKO.

Example 28. (SI-HOEA)$_{12}$/BA/N-100/MEKO (0.6/0.6/3/1.8)

Example 28 was made using the procedure of Example 17, but using N100 instead of PAPI and using behenyl alcohol (BA) instead of stearyl alcohol (SA). The material of Example 28 is a fluorine-free treating composition wherein the compound(s) are derived from a reaction mixture of:

(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;

(ii) a polymeric isocyanate, N100;

(iii) a monomeric isocyanate reactive compound, behenyl alcohol, BA; and (iv) an isocyanate blocking agent, MEKO.

Example 29. (SA-AOI/LA-AOI 80/20)$_{12}$/SA/PAPI/MEKO (0.6/0.6/3/1.8)

Example 29 was made using the procedure of Example 20. The material of Example 29 is a fluorine-free treating composition wherein the compound(s) are derived from a reaction mixture of:

(i) an isocyanate reactive oligomer, having 12 repeating units, made by the radical initiated reaction of 1 mole of 2-mercaptoethanol and 12 moles of a blend of acrylate monomers comprising 80% of an acrylate monomer comprising a urethane group and a hydrocarbon group having 18 carbon atoms;

(ii) a polymeric isocyanate, PAPI;

(iii) a monomeric isocyanate reactive compound, stearyl alcohol, SA; and (iv) an isocyanate blocking agent, MEKO.

Example 30. (SA-AOI/DDA)$_{12}$/SA/PAPI/MEKO (0.6/0.6/3/1.8)

Example 30 was made using the procedure of Example 20. The material of example 30 is a fluorine-free treating composition wherein the compound(s) are derived from a reaction mixture of:

(i) an isocyanate reactive oligomer, having 12 repeating units, made by the radical initiated reaction of 1 mole of 2-mercaptoethanol and 12 moles of a blend of acrylate monomers comprising 80% of an acrylate monomer comprising a urethane group and a hydrocarbon group having 18 carbon atoms;

(ii) a polymeric isocyanate, PAPI;

(iii) a monomeric isocyanate reactive compound, stearyl alcohol, SA; and (iv) an isocyanate blocking agent, MEKO.

Example 31. (SI-HOEA/HOEA/Octylmercaptan 9/1/1)/BA/PAPI/MEKO (0.6/0.6/3/1.8)

Example 31 was made using the procedure of Example 20. The material of example 31 is a fluorine-free treating composition wherein the compound(s) are derived from a reaction mixture of:

(i) an isocyanate reactive oligomer, comprising 10 repeating units made by the radical initiated reaction of 1 mole of octylmercaptane, 1 mole of hydroxyethyl acrylate and 9 moles of an acrylate monomer comprising a urethane group and a hydrocarbon group having 18 carbon atoms;

(ii) a polymeric isocyanate, PAPI;

(iii) a monomeric isocyanate reactive compound, stearyl alcohol, SA; and (iv) an isocyanate blocking agent, MEKO.

Emulsification of Examples 20-31

In a 1000-mL three-necked flask, fitted with a stirrer, heating mantle, thermometer and cooler were placed 200 g of a 50% solids ethyl acetate containing reaction mixture. The mixture was heated up to 70° C. and mixed until a clear solution in ethyl acetate was obtained. In a 1000-mL beaker were placed 3 g Tergitol 15-S-30, 6 g Tergitol TMN-6, 3.7 g Armocare VGH-70, and 400 g DI-water. This mixture was warmed up to about 70° C. and then added under vigorous stirring to the above mentioned organic solution in the 1000 ml three-necked flask. A pre-emulsion was obtained at 70° C. This pre-emulsion was passed 3 times through a pre-heated 2-step Manton-Gaulin homogenizer at 300 bar pressure. Solvent was stripped off at temperature of about 45 to 50° C. and vacuum of about 20-30 mm Hg. A stable dispersion at about 20% solids in water resulted. Particle size was 120-180 nm.

Textile Treatments Examples 20-31

Treatment of the textiles for Examples 20-31 was done according to the procedures "Treatment Procedure via Padding Process" and "Spray Rating (SR)" with the following differences: the treatment bath contained 0.1% acetic acid and 1% isopropanol; cure after treatment was 2 min at 175° C.; and fabrics were laundered at 40° C. and ironed at 180° C. for 3 seconds.

TABLE 6

Spray Ratings 0.6% SOF; curing 2 min 175° C.

| Example | PES (76.4% WPU) Initial | PA (74.9% WPU) Initial | PES 10LD | PA 10LD | PES 20LD | PA 20LD |
|---|---|---|---|---|---|---|
| EX 20 | 100 | 100 | 90 | 80 | 90 | 70 |
| EX 21 | 100 | 100 | 90 | 80 | 85 | 80 |
| EX 22 | 100 | 100 | 80 | 80 | 80 | 80 |
| EX 23 | 100 | 100 | 80 | 80 | 80 | 80 |
| EX 24 | 90 | 80 | 80 | 80 | 70 | 70 |
| EX 25 | 100 | 100 | 90 | 90 | 90 | 85 |
| EX 26 | 100 | 100 | 90 | 80 | 90 | 80 |
| EX 27 | 100 | 100 | 80 | 80 | 80 | 80 |
| EX 28 | 100 | 100 | 90 | 85 | 80 | 80 |
| EX 29 | 100 | 100 | 90 | 80 | 85 | 80 |
| EX 30 | 100 | 100 | 80 | 80 | 70 | 70 |
| EX 31 | 100 | 100 | 90 | 90 | 85 | 80 |

Examples 32-38. Blocked Urethanes Containing Polydimethylsiloxane (PDMS) Containing Segments Example 32. Synthesis of $(SA-AOI)_{12}/IM-11/PAPI/MEKO$ (0.6/0.3/3/1.8)

In a three-necked 250-mL flask fitted with a stirrer, heating mantle, cooler and thermometer were placed 54 g (0.2 mol) SA, 28.2 g AOI (0.2 mol), 35 g ethylacetate, and 1 drop of DBTDL. The reaction mixture was reacted for 5 hrs at 85° C. under nitrogen atmosphere. IR check showed that all isocyanate had reacted. The mixture was cooled to 60° C. and 1.3 g 2-mercaptoethanol (0.017 mol) and 0.2 g VAZO-67 were added. The mixture was degassed 3 times using aspirator vacuum and nitrogen and then heated up to about 70° C. A vigorous exotherm took off up to 88° C. The reaction was continued for 3 hrs at 85° C. under nitrogen. Then, 0.06 g VAZO-67 was added and the reaction continued for 16 hrs. A clear solution of the hydroxyl functionalized oligomer was obtained. The reaction mixture was diluted by using 60 g ethylacetate and cooled to 60° C. under nitrogen. Then, 11.6 g (0.085 equiv) of PAPI and 9.5 g (0.0085 mol) of IM-11 PDMS diol were added and reacted for 16 hrs at 85° C. As a last step, 4.4 g MEKO (0.051 mol) were added an reacted for 2 hrs at 82° C. IR analysis indicated that all isocyanate had reacted. A clear amber brown colored solution was obtained at 82° C.

The material of Example 32 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;
(ii) a polymeric isocyanate, PAPI;
(iii) a dimeric isocyanate reactive compound, PDMS diol with an average molecular weight of 1120; and
(iv) an isocyanate blocking agent, MEKO.

Example 33.
$(SI-HOEA)_{12}/X-22-170D/PAPI/MEKO$
(0.1/0.05/1/0.85)

Example 33 was prepared using the procedure of Example 32, but using oligomer $(SI-HOEA)_{12}$ instead of $(SA-AOI)_{12}$ and using PDMS X-22-170D instead of IM-11. The material of Example 33 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;
(ii) a polymeric isocyanate, PAPI;
(iii) a dimeric isocyanate reactive compound, PDMS diol with an average molecular weight of 2240; and
(iv) an isocyanate blocking agent, MEKO.

Example 34. $(SI-HOEA)_{8}/X-22-170D/PAPI/MEKO$
(0.2/0.02/1/0.78)

Example 34 was made using the procedure of Example 33, but using different molar ratios of the reagents. The material of Example 34 is a fluorine-free treating composition wherein the compound is derived from a reaction mixture of:
(i) an isocyanate reactive oligomer, having 8 repeating units, made by the radical initiated reaction of 1 mole of 2-mercaptoethanol and 8 moles of an acrylate monomer comprising a urethane group and a hydrocarbon group having 18 carbon atoms;
(ii) a polymeric isocyanate, PAPI;
(iii) a dimeric isocyanate reactive compound, PDMS diol with an average molecular weight of 2240; and
(iv) an isocyanate blocking agent, MEKO.

Example 35.
$(SI-HOEA)_{12}/X-22-170A/PAPI/MEKO$
(0.2/0.1/1/0.7)

Example 35 was prepared using the procedure of Example 33 but using PDMS X-22-170A. The material of Example 35 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;
(ii) a polymeric isocyanate, PAPI;

(iii) a dimeric isocyanate reactive compound, PDMS diol with an average molecular weight of 1806; and
(iv) an isocyanate blocking agent, MEKO.

Example 36.
(SI-HOEA)$_{12}$/X-22-170A/PAPI/MEKO
(0.1/0.2/1/0.7)

Example 36 was made using the procedure of Example 35, but using different molar ratios of the reagents. The material of Example 36 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 18 carbon atoms;
(ii) a polymeric isocyanate, PAPI;
(iii) a dimeric isocyanate reactive compound, PDMS diol with an average molecular weight of 1806; and
(iv) an isocyanate blocking agent, MEKO.

Example 37.
(BA-TDI-HOEA)$_{12}$/X-22-170A/PAPI/MEKO
(0.6/0.6/3/1.8)

Example 37 was made according to the procedure of Example 32 but using (TDI-BA-HOEA)$_{12}$ as oligomer and X-22-170A as polydimethylsiloxane derivative. The material of Example 37 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising two urethane groups and a hydrocarbon group having 22 carbon atoms;
(ii) a polymeric isocyanate, PAPI;
(iii) a dimeric isocyanate reactive compound, PDMS diol with an average molecular weight of 1806; and
(iv) an isocyanate blocking agent, MEKO.

Example 38. (BA-AOI)$_{12}$/KF 6001/PAPI/MEKO
(0.6/0.3/3/1.8)

Example 38 was prepared using the procedure of Example 32 but using (BA-AOI)$_{12}$ as oligomer and KF-6001 as PDMS-diol. The material of Example 30 is a fluorine-free treating composition wherein the compound(s) are derived from a reaction mixture of:
(i) an isocyanate reactive oligomer, having 12 repeating units, made by the radical initiated reaction of 1 mole of 2-mercaptoethanol and 12 moles of an acrylate monomer comprising a urethane group and a hydrocarbon group having 22 carbon atoms;
(ii) a polymeric isocyanate, PAPI;
(iii) a dimeric isocyanate reactive compound, PDMS diol with equivalent weight of 900; and
(iv) an isocyanate blocking agent, MEKO.

Emulsification Procedure

In a three-necked 1000-mL flask fitted with a stirrer, heating mantle, thermometer and cooler were placed 200 g of a 50% solids reaction mixture (in ethylacetate). The mixture was heated up to 70° C. and mixed until a clear solution in ethylacetate was obtained. In a 1000-mL beaker were placed 3 g Tergitol 15-S-30, 6 g Tergitol TMN-6, 3.7 g Armocare VGH-70 (70% solids) and 400 g DI-water. This mixture was also warmed up to about 70° C. and then added under vigorous stirring to the above mentioned organic solution in the 1000 ml three-necked flask. A pre-emulsion was obtained at 70° C. This pre-emulsion was passed 3 times through a pre-heated 2-step Manton-Gaulin homogenizer at 300 bar pressure. Solvent was stripped of at temperature of about 45 to 50° C. and vacuum of about 20-30 mm Hg. A stable dispersion at about 20% solids in water resulted with particle size 120-180 nm.

Spray Rating Testing

Textile fabrics PES microfiber and PA microfiber fabric were treated by the "Padding Process" using an aqueous treatment bath containing 0.1% acetic acid and 1% isopropanol. Curing was done for 2 min at 175° C. The fabrics were tested for their water repellency by the "Spray Rating" test. Fabrics were laundered for 5 and 10 times at 40° C. with the laundering procedure described under "Spray Rating" except after the last cycle fabrics were tumble dried and ironed at 180° C. for 3 seconds and the spray rating value was determined again.

TABLE 7

| | Spray Ratings | | | | | |
|---|---|---|---|---|---|---|
| Example | PES (76.4% WPU) Initial | PA (74.9% WPU) Initial | PES 5LD | PA 5LD | PES 10LD | PA 10LD |
| EX 32 | 100 | 100 | 100 | 90 | 80 | 85 |
| EX 33 | 100 | 100 | ND | ND | ND | ND |
| EX 34 | 100 | 95 | ND | ND | ND | ND |
| EX 35 | 85 | 70 | ND | ND | ND | ND |
| EX 36 | 80 | 70 | ND | ND | ND | ND |
| EX 37 | 100 | 90 | 90 | 80 | 70 | 70 |
| EX 38 | 100 | 100 | 90 | 90 | 80 | 80 |

ND = not determined

Example 39. (ODA)(HOEA)$_8$-SC$_2$H$_4$—OH+SI/SA/PAPI/MEKO (0.1/0.2/1/0.7)

Preparation of (ODA)$_2$(HOEA)$_8$-SC$_2$H$_4$—OH Oligomer

In a 1-liter round-bottomed 3-necked reaction flask, 32.4 g (0.1 mole) of octadecyl acrylate monomer was mixed with 46.5 g (0.4 mole) HOEA, 3.9 g (0.05 moles) 2-mercaptoethanol, and 80 g ethylacetate. Nitrogen was bubbled through for 2 min, 0.2 g V-67 initiator was added and the mixture was heated to 70° C. An exotherm was observed and the reaction was continued for 15 hrs at 70° C. Then, again 0.1 g of VAZO-67 was added and the reaction continued for another 4 hrs. When cooled to room temperature the solution obtained was about 50% solids in ethylacetate with a theoretical MW of 1655.9.

Preparation of (ODA)$_2$(HOEA)$_8$-SC$_2$H$_4$—OH+SI Oligomer

In a 1-liter round-bottomed 3-necked reaction flask, 140 g ethyl acetate was added to 82.9 g (0.05 mole) of (ODA)$_2$(HOEA)$_8$-SC$_2$H$_4$—OH oligomer, prepared as above. Then, 25 g of the ethyl acetate was distilled off and the mix cooled to 75° C. To this was added 118.2 g (0.4 moles) of stearyl isocyanate and heated at 75° C. for 2 hrs before 1 drop of DBTDL was added. A mild exotherm occurred which raised the temperature to 78° C. After 5 hrs the —NCO peak had disappeared when analyzed by IR. The theoretical M.W. of the oligomer was 4015.9 and the waxy material obtained was 51.5% solids in ethyl acetate.
Preparation of (ODA)$_2$(HOEA-SC$_2$H$_4$—OH+SI/SA/PAPI/MEKO (0.1/0.2/1/0.7)

In a 500-mL round-bottomed 3-necked reaction flask, 87.8 g (ODA)$_2$(HOEA)$_8$-SC$_2$H$_4$—OH+SI oligomer, prepared as above (MW 4015.9, 0.012 moles, 51.5% in ethylacetate), 6.07 g SA (MW 270.5, 0.022 mole), 15 g PAPI (EW 136, 0.11 mole)) and 25 g ethylacetate was mixed and reacted overnight at 75° C. Then, 6.9 g MEKO (MW 87.12, 0.078 mole) was added under stirring, and the mixture heated at 75° C. for another 4 hrs. This resulted in a about 50% solids.

The above solution was then dispersed in water by mixing it at 65° C. with a water phase, consisting of 275 g deionized (DI) water, 2.9 g Arquad 12-50 (Akzo Nobel), 4.4 g Tergitol TMN-6 and 2.2 g Tergitol 15-S-30. This premix was then passed through a microfluidizer 2 times. The ethylacetate was then removed by vacuum distillation to result in a stable solvent free dispersion which was diluted to 25% solids with DI-water. The material is referenced as (ODA)$_2$(HOEA)$_8$-SC$_2$H$_4$—OH+SI/SA/PAPI/MEKO (0.1/0.2/1/0.7) where the numbers in parentheses refer to the relative moles of the 4 reactants identified by the previously described acronyms.

The material of Example 39 is a fluorine-free treating composition wherein the compound(s) are derived from a reaction mixture of:
(i) a isocyanate-reactive oligomer having 10 repeating units;
(ii) a polymeric isocyanate, PAPI; and
(iv) an isocyanate blocking agent, MEKO.
wherein the oligomer is made by the radical initiated reaction of a reaction mixture comprising a mercaptan (2-mercaptoethanol) and a (meth)acrylate monomer (ODA and HOEA) comprising an isocyanate-derived group (urethane) and a hydrocarbon group having at least 16 carbon atoms (18 carbons).

Example 40. (ODA)$_1$(HOEA)$_9$-S—C$_2$H$_4$—COOC$_{18}$H$_{37}$+SI/SA/PAPI/MEKO (0.1/0.2/1/0.7)

With exactly the same procedure as in Example 39 but using ODMP as the mercaptan, (ODA)$_1$(HOEA)$_9$-S—C$_2$H$_4$—COOC$_{18}$H$_{37}$ oligomer (MW 1728) was prepared with weights being adjusted for the MW of the oligomer. Then with exactly the same procedure as in Example 31 (ODA)$_1$(HOEA)$_9$-S—C$_2$H$_4$—COOC$_{18}$H$_{37}$+SI oligomer (MW 4088) was prepared with weights being adjusted for the MW of the oligomer. Finally, with exactly the same procedure as in Example 39 (ODA)$_1$(HOEA)$_9$-S—C$_2$H$_4$—COOC$_{18}$H$_{37}$+SI/SA/PAPI/MEKO (0.1/0.2/1/0.7) was prepared and emulsified with weights being adjusted for the amounts used.

The material of Example 40 is a fluorine-free treating composition wherein the compound(s) are derived from a reaction mixture of:
(i) a isocyanate-reactive oligomer having 10 repeating units;
(ii) a polymeric isocyanate, PAPI; and
(iv) an isocyanate blocking agent, MEKO;
wherein the oligomer is made by the radical initiated reaction of a reaction mixture comprising a mercaptan (ODMP) and a (meth)acrylate monomer (ODA and HOEA) comprising an isocyanate-derived group (urethane) and a hydrocarbon group having at least 16 carbon atoms (18 carbons).

Spray rating performances for Examples 39 and 40 are found in Table 8.

TABLE 8

| | Spray Ratings | | | | | |
|---|---|---|---|---|---|---|
| Example | NTD (66% WPU) Initial | PPP (73% WPU) Initial | NTD 5LD | PPP 5LD | NTD 20LD | PPP 20LD |
| EX 39 | 100 | 100 | 85 | 100 | 60 | 85 |
| EX 40 | 100 | 100 | 85 | 100 | 70 | 80 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:
1. A fluorine-free treating composition comprising:
one or more compounds derived from a reaction mixture comprising:
(i) at least one isocyanate-reactive oligomer comprising 2 to 20 repeating units;
(ii) at least one polyisocyanate;
(iii) optionally at least one additional isocyanate-reactive compound; and
(iv) optionally at least one isocyanate blocking agent;
wherein the isocyanate-reactive oligomer is made by the radical-initiated reaction of a reaction mixture comprising at least one mercaptan and at least one (meth)acrylate monomer, wherein the at least one (meth)acrylate monomer comprises at least one isocyanate-derived group and at least one hydrocarbon group having at least 16 carbon atoms.

2. The fluorine-free composition of claim 1 wherein the isocyanate-reactive oligomer is made from at least 70 wt-% (meth)acrylate monomers having an isocyanate-reactive group and a hydrocarbon group having at least 16 carbon atoms, based on the total weight of monomers.

3. The fluorine-free composition of claim 1 wherein the mercaptan is non-functionalized or is functionalized with at least one isocyanate-reactive group.

4. The fluorine-free composition of claim 3 wherein the mercaptan is functionalized with at least one alcohol or amine group.

5. The fluorine-free composition of claim 1 wherein the isocyanate-reactive oligomer comprises a blocked isocyanate group.

6. The fluorine-free composition of claim 1 wherein the (meth)acrylate comprising at least one isocyanate-derived group and at least one hydrocarbon group having at least 16 carbon atoms has at least one of the following formulas:

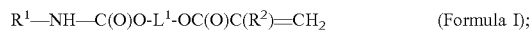

R$^1$—NH—C(O)O-L$^1$-OC(O)C(R$^2$)=CH$_2$  (Formula I);

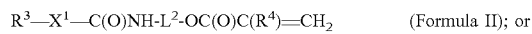

R$^3$—X$^1$—C(O)NH-L$^2$-OC(O)C(R$^4$)=CH$_2$  (Formula II); or

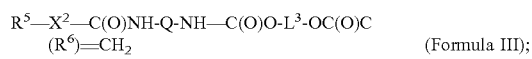

R$^5$—X$^2$—C(O)NH-Q-NH—C(O)O-L$^3$-OC(O)C(R$^6$)=CH$_2$  (Formula III);

wherein:
- $R^1$, $R^3$, and $R^5$ are independently a hydrocarbon group having at least 16 carbon atoms;
- $R^2$, $R^4$, and $R^6$ are independently H or $CH_3$;
- $L^1$, $L^2$, and $L^3$ are independently a branched or straight chain alkylene group having 2 to 10 carbon atoms, an arylene group, or a combination thereof;
- $X^1$ and $X^2$ are independently O, S, —NH, or —N($R^{10}$), wherein $R^{10}$ is a hydrocarbon group having 1 to 20 carbon atoms; and
- Q is a divalent isocyanate residue.

7. The fluorine-free composition of claim 1 wherein the oligomer comprises at least one of the following formulas:

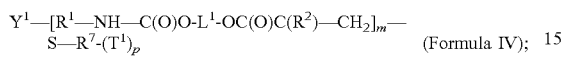  (Formula IV);

  (Formula V); or

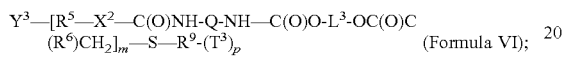  (Formula VI);

wherein:
- $Y^1$, $Y^2$, and $Y^3$ are independently H or an initiator residue;
- $R^1$, $R^3$, and $R^5$ are independently a hydrocarbon group having at least 16 carbon atoms;
- $R^2$, $R^4$, and $R^6$ are independently H or $CH_3$;
- $L^1$, $L^2$, and $L^3$ are independently a branched or straight chain alkylene group having 2 to 10 carbon atoms, an arylene group, or a combination thereof;
- $X^1$ and $X^2$ are independently O, S, —NH, or —N($R^{10}$), wherein $R^{10}$ is a hydrocarbon group of 1 to 20 carbon atoms;
- Q is a divalent isocyanate residue;
- each m is independently an integer of 2 to 20;
- $R^7$, $R^8$, and $R^9$ are independently a divalent or trivalent linking group having 1 to 10 carbon atoms;
- $T^1$, $T^2$, and $T^3$ are is independently —OH, —$NH_2$, or —NH($R^{11}$), wherein $R^{11}$ is H a hydrocarbon group having 1 to 10 carbon atoms;
- each p is independently 1 or 2; and
- S is sulfur.

8. The fluorine-free composition of claim 1 wherein the polyisocyanate is an aliphatic diisocyanate, an aromatic diisocyanate, an aromatic triisocyanate, an aromatic polymeric isocyanate, an aliphatic polymeric isocyanate, or a mixture thereof.

9. The fluorine-free composition of claim 1 further comprising at least one additional isocyanate-reactive monofunctional, difunctional, or polyfunctional compound.

10. The fluorine-free composition of claim 1 wherein the reaction mixture for making the one or more compounds further comprises at least one isocyanate-reactive difunctional compound having the following formula:

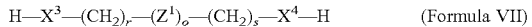  (Formula VII)

wherein:
- $X^3$ and $X^4$ are independently O, S, —NH, or —N($R^{10}$), wherein $R^{10}$ is a hydrocarbon group having 1 to 20 carbon atoms;
- r and s are independently integers from 1 to 12;
- o is 0 or 1; and
- $Z^1$ is selected from:
  - a straight chain or branched alkylene group having 1 to 20 carbon atoms;
  - a divalent polydimethylsiloxane group comprising 2 to 100 dimethylsiloxane repeating units;
  - a divalent polyoxyalkylene group comprising 2 to 100 alkylene oxide repeating units, wherein each alkyleneoxide repeating unit independently has 2 to 10 carbon atoms; and
  - a combination thereof.

11. The fluorine-free composition of claim 1 wherein the oligomer is made by the oligomerization of at least one mercaptan with at least one (meth)acrylate monomer comprising at least one isocyanate-derived group and at least one hydrocarbon group having at least 16 carbon atoms, wherein the molar ratio of the mercaptan with the (meth)acrylate is 1:4 to 1:20.

12. The fluorine-free composition of claim 1 wherein the oligomer is made by the oligomerization of at least one mercaptan with at least one (meth)acrylate monomer comprising a urethane group and a hydrocarbon group having at least 16 carbon atoms, wherein the molar ratio of the mercaptan with the (meth)acrylate is 1:4 to 1:20.

13. The fluorine-free composition of claim 1 wherein the oligomer is made by the oligomerization of at least one mercaptan with at least one (meth)acrylate monomer comprising a urea group and a hydrocarbon group having at least 16 carbon atoms, wherein the molar ratio of the mercaptan with the (meth)acrylate is 1:4 to 1:20.

14. The fluorine-free composition of claim 1 wherein the composition is an aqueous dispersion optionally comprising one or more additives selected from a surfactant, a coalescing solvent, an anti-freeze solvent, an emulsifier, and a stabilizer against one or more microorganisms.

15. A method of treating a fibrous substrate comprising applying to the fibrous substrate a composition of claim 1 in an amount sufficient to make the fibrous substrate water repellent.

16. A fibrous substrate treated by the method of claim 15.

* * * * *

UNITED STATES PATENT AND TRADEMARK OFFICE
CERTIFICATE OF CORRECTION

PATENT NO. : 10,294,609 B2
APPLICATION NO. : 15/548196
DATED : May 21, 2019
INVENTOR(S) : Dams et al.

It is certified that error appears in the above-identified patent and that said Letters Patent is hereby corrected as shown below:

On the Title Page

Item (57), Column 2 (Abstract)
Line 9, delete "Sat" and insert -- at --, therefor.

In the Specification

Column 2
Line 16, delete "are is" and insert -- are --, therefor.

Column 6
Line 42-43, delete "stearylisocynate" and insert -- stearylisocyanate --, therefor.

Column 7
Line 20, delete "steraryl" and insert -- stearyl --, therefor.
Line 24-25, delete "dibutyl tindilaurate" and insert -- dibutyltin dilaurate --, therefor.

Column 8
Line 26-27, delete "di-t-butylperoxyphtalate," and insert -- di-t-butylperoxyphthalate, --, therefor.

Column 9
Line 8 (approx.), delete "VI);" and insert -- VI). --, therefor.
Line 16 (approx.), delete "di-t-butylperoxyphtalate," and insert -- di-t-butylperoxyphthalate, --, therefor.
Line 49 (approx.), delete "are is" and insert -- are --, therefor.

Column 10
Line 19, delete "$R^1=$" and insert -- $R^1=$ --, therefor.
Line 19, delete "$R^2=$" and insert -- $R^2=$ --, therefor.
Line 20, delete "$R^7=$" and insert -- $R^7=$ --, therefor.

Signed and Sealed this
Twelfth Day of November, 2019

Andrei Iancu
*Director of the United States Patent and Trademark Office*

Line 30, delete "$R^3$=" and insert -- $R^3$= --, therefor.
Line 31, delete "$X^1$=" and insert -- $X^1$= --, therefor.
Line 31, delete "$R^4$=" and insert -- $R^4$= --, therefor.
Line 31, delete "$R^8$=" and insert -- $R^8$= --, therefor.

Column 11
Line 54, delete "4,4'-methylenediphenylenediisocyanate" and insert
-- 4,4'-methylenediphenyldiisocyanate, --, therefor.

Column 12
Line 38-39, delete "poly(oyalkylene)" and insert -- poly(oxyalkylene) --, therefor.

Column 16
Line 19 (approx.), delete "($R^6$)= $CH_2$" and insert -- ($R^6$)=$CH_2$ --, therefor.
Line 52 (approx.), delete "$R^1$" and insert -- $R^7$ --, therefor.

Column 17
Line 11, delete "are is" and insert -- are --, therefor.

Column 19
Line 12 (approx.), delete "are is" and insert -- are --, therefor.

Column 19-Column 20
Line 51 (approx.), delete ""Voronate" and insert -- "Voranate --, therefor.
Line 58 (approx.), delete "emulsfier" and insert -- emulsifier --, therefor.
Line 69 (approx.), delete "triemethyl" and insert -- trimethyl --, therefor.

Column 21-Column 22
Line 11 (approx.), delete "4-hydroxbutyl" and insert -- 4-hydroxybutyl --, therefor.
Line 54 (approx.), delete "Polyester." and insert -- Polyester --, therefor.

Column 22
Line 60, delete "killogram" and insert -- kilogram --, therefor.

Column 23
Line 36, delete "SI-HEMA. SI-HOBA. SI-HOPA." and insert -- SI-HEMA, SI-HOBA, SI-HOPA, --, therefor.
Line 46, delete "CH=CH 2," and insert -- CH=$CH_2$, --, therefor.

Column 27
Line 15, delete "hydroxyfunctionalized" and insert -- hydroxy functionalized --, therefor.
Line 59, delete "Re" and insert -- $R^8$ --, therefor.

Column 31
Line 30 (approx.), delete "Publicaiton" and insert -- Publication --, therefor.

CERTIFICATE OF CORRECTION (continued)
U.S. Pat. No. 10,294,609 B2

Column 36
Line 48, delete "octylmercaptane," and insert -- octylmercaptan, --, therefor.

Column 40
Line 40, delete "(ODA)(HOEA)" and insert -- $(ODA)_2(HOEA)$ --, therefor.

Column 41
Line 3, delete "(HOEA-" and insert -- $(HOEA)_8$- --, therefor.

In the Claims

Column 43
Line 38, in Claim 7, delete "are is" and insert -- are --, therefor.